United States Patent
Yamashita et al.

(10) Patent No.: US 9,434,096 B2
(45) Date of Patent: Sep. 6, 2016

(54) DECORATIVE RESIN SHEET, AND MOLDED RESIN ARTICLE AND PROCESS FOR PRODUCTION THEREOF

(75) Inventors: Koichi Yamashita, Koga (JP); Shigehiro Kanou, Koga (JP); Masami Nishikawa, Koga (JP); Kaoru Yaguchi, Koga (JP); Fumihito Tonomura, Koga (JP)

(73) Assignees: KANEKA CORPORATION, Osaka (JP); TATSUTA CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 13/877,867

(22) PCT Filed: Sep. 6, 2011

(86) PCT No.: PCT/JP2011/070220
§ 371 (c)(1),
(2), (4) Date: Apr. 4, 2013

(87) PCT Pub. No.: WO2012/046531
PCT Pub. Date: Apr. 12, 2012

(65) Prior Publication Data
US 2013/0216782 A1    Aug. 22, 2013

(30) Foreign Application Priority Data

Oct. 5, 2010 (JP) ................. 2010-225406
Jul. 22, 2011 (JP) ................. 2011-161241

(51) Int. Cl.
*B29C 45/14* (2006.01)
*B32B 3/30* (2006.01)
(Continued)

(52) U.S. Cl.
CPC ..... *B29C 45/14827* (2013.01); *B29C 37/0032* (2013.01); *B29C 37/0053* (2013.01);
(Continued)

(58) Field of Classification Search
USPC ............ 264/259, 264, 265, 328.1, 334, 485, 264/487, 494
See application file for complete search history.

(56) References Cited

U.S. PATENT DOCUMENTS 3,250,417 A * 5/1966 Powers, Jr. et al. .......... 215/321
5,152,861 A * 10/1992 Hann ............................ 156/230
(Continued)

FOREIGN PATENT DOCUMENTS

EP    0 456 822 A1    11/1991
JP    63-224918 A    9/1988
(Continued)

OTHER PUBLICATIONS

Extended Search Report issued in corresponding European Patent Application No. 11830464.4 dated Dec. 9, 2013.
(Continued)

*Primary Examiner* — Atul P. Khare
(74) *Attorney, Agent, or Firm* — Sughrue Mion, PLLC

(57) ABSTRACT

Provided are a decorative resin sheet that sufficiently brings together embossing property and embossment-retaining property, and a molded resin article on which an embossment excellent in design is formed and a method of manufacturing the molded resin article. The method of manufacturing a molded resin article includes the steps of: providing a resin sheet having a mold layer containing a polyolefin-based resin as a main component, followed by formation of an embossment on the resin sheet so that the embossment is formed on a surface of the mold layer; crosslinking the mold layer on which the embossment is formed so that a 100% modulus of the resin sheet at 200° C. becomes 0.02 MPa or more, which is measured in conformity with JIS K6251 (2004 version); placing the resultant resin sheet (10) in an injection molding die (20) so that the surface (11) of the mold layer faces a side from which a molten resin (30) is injected; injecting the molten resin (30) onto a side of the surface (11) of the mold layer in the injection molding die (20) to mold a molded resin article; and separating the molded resin article and the mold layer.

12 Claims, 15 Drawing Sheets

(51) Int. Cl.
*B29C 37/00* (2006.01)
*B29C 45/37* (2006.01)
*B32B 27/08* (2006.01)
*B32B 27/32* (2006.01)
*B29D 7/01* (2006.01)
*B32B 3/26* (2006.01)
*B29C 35/08* (2006.01)

(52) U.S. Cl.
CPC ............ *B29C45/372* (2013.01); *B29D 7/01* (2013.01); *B32B 3/263* (2013.01); *B32B 3/30* (2013.01); *B32B 27/08* (2013.01); *B32B 27/32* (2013.01); *B29C 2035/085* (2013.01); *B29C 2035/0827* (2013.01); *B29C 2035/0833* (2013.01); *B29C 2035/0877* (2013.01); *B29C 2037/0042* (2013.01); *B29C 2037/0046* (2013.01); *B32B 2451/00* (2013.01); *Y10T 428/24355* (2015.01); *Y10T 428/24479* (2015.01)

(56) References Cited

U.S. PATENT DOCUMENTS

| | | | |
|---|---|---|---|
| 5,639,536 A | | 6/1997 | Yamazaki et al. |
| 5,843,555 A | * | 12/1998 | Atake et al. ................ 428/98 |
| 5,851,558 A | * | 12/1998 | Atake ............... B29C 45/1418 264/328.12 |
| 6,077,472 A | * | 6/2000 | Kataoka et al. ............ 264/338 |
| 8,632,719 B2 | * | 1/2014 | Ohya et al. ....... B29C 45/14827 264/259 |
| 2005/0181204 A1 | * | 8/2005 | Wang et al. ................ 428/354 |
| 2007/0267130 A1 | * | 11/2007 | Wang et al. ................ 156/231 |
| 2008/0230941 A1 | * | 9/2008 | Williamson et al. ......... 264/135 |
| 2011/0079933 A1 | * | 4/2011 | Sheu .......................... 264/101 |
| 2012/0006480 A1 | * | 1/2012 | Ohya et al. ........ B29C 51/422 156/285 |

FOREIGN PATENT DOCUMENTS

| | | |
|---|---|---|
| JP | 01-301316 A | 12/1989 |
| JP | 02-103136 A | 4/1990 |
| JP | 05-169598 A | 7/1993 |
| JP | 05-177704 A | 7/1993 |
| JP | 9-262867 A | 10/1996 |
| JP | 9-267357 A | 10/1997 |
| JP | 2000-135756 A | 5/2000 |
| JP | 2004-106445 A | 4/2004 |
| JP | 2004-4188698 A | 7/2004 |
| JP | 2004284178 A * | 10/2004 |
| JP | 2008-162165 A | 7/2008 |
| WO | WO 94/13465 A1 | 6/1994 |
| WO | WO 2010113601 A1 * | 10/2010 |
| WO | 2011/013659 A1 | 2/2011 |
| WO | 2011/081994 A1 | 7/2011 |

OTHER PUBLICATIONS

Notice of Reasons for Refusal issued in corresponding Japanese Patent Application No. 2013-095998 dated Jul. 2, 2013. Concise Statement of Relevance.

Communication dated Jan. 27, 2015, issued by the European Patent Office in counterpart Application No. 11830464.1.

* cited by examiner

FIG.11

| | | | EXAMPLE1 | EXAMPLE2 | EXAMPLE3 | EXAMPLE4 | EXAMPLE5 | EXAMPLE6 | EXAMPLE7 | EXAMPLE8 | EXAMPLE9 | EXAMPLE10 | EXAMPLE11 | EXAMPLE12 | EXAMPLE13 |
|---|---|---|---|---|---|---|---|---|---|---|---|---|---|---|---|
| RAW MATERIAL COMPOSITION | FORMULATION | | FORMULATION 1 | FORMULATION 1 | FORMULATION 2 | FORMULATION 3 | FORMULATION 4 | FORMULATION 5 | FORMULATION 5 | FORMULATION 5 | FORMULATION 6 | FORMULATION 5 | FORMULATION 6 | FORMULATION 7 | FORMULATION 7 |
| | RESIN | TPO-I | 80 | 80 | 80 | 70 | — | — | — | — | — | — | — | — | — |
| | | TPO-II | — | — | — | — | 40 | — | — | — | — | — | — | — | — |
| | | TPO-III | — | — | — | — | 25 | 20 | 20 | 20 | 20 | 20 | 20 | — | — |
| | | TPO-IV | — | — | — | — | — | 30 | 30 | 30 | 30 | 30 | 30 | — | — |
| | | LLDPE-I | 20 | 20 | 20 | 30 | 30 | 20 | 20 | 20 | 20 | 20 | 20 | — | — |
| | | LLDPE-II | — | — | — | — | — | 25 | 25 | 25 | 25 | 25 | 25 | 100 | 100 |
| | | RANDOM PP | — | — | — | — | — | 5 | 5 | 5 | 5 | 5 | 5 | — | — |
| | CROSSLINKING AID | TMPTMA | 2 | 2 | — | 2 | 5 | 2 | 2 | 2 | — | — | — | — | — |
| DECORATIVE RESIN SHEET | ELECTRON BEAM IRRADIATION CONDITION | ACCELERATING VOLTAGE(kV) | 200 | 200 | 200 | 200 | 200 | 200 | 200 | 200 | 200 | 200 | 200 | 200 | 200 |
| | | IRRADIATION DOSE(kGy) | 100 | 200 | 200 | 100 | 100 | 50 | 100 | 200 | 50 | 100 | 200 | 100 | 200 |
| | AVERAGE THICKNESS OF DECORATIVE RESIN SHEET (μm) | | 280 | 290 | 260 | 280 | 270 | 300 | 270 | 290 | 290 | 290 | 300 | 260 | 290 |
| | R₂JIS OF EMBOSSMENT (μm) | | 90 | 90 | 100 | 90 | 110 | 110 | 110 | 110 | 100 | 100 | 100 | 90 | 100 |
| | 100% MODULUS(MPa) | | 0.021 | 0.032 | 0.039 | 0.027 | 0.041 | 0.150 | 0.220 | 0.339 | 0.095 | 0.190 | 0.292 | 0.038 | 0.091 |
| INJECTION MOLDING | RELEASABILITY | | ○ | ○ | ○ | ○ | ○ | ○ | ○ | ○ | ○ | ○ | ○ | ○ | ○ |
| | EMBOSSMENT TRANSFERABILITY | | ○ | ○ | ○ | ○ | ○ | ○ | ○ | ○ | ○ | ○ | ○ | ○ | ○ |

FIG.12

| | | | COMPARATIVE EXAMPLE1 | COMPARATIVE EXAMPLE2 | COMPARATIVE EXAMPLE3 | COMPARATIVE EXAMPLE4 | COMPARATIVE EXAMPLE5 | COMPARATIVE EXAMPLE6 | COMPARATIVE EXAMPLE7 | COMPARATIVE EXAMPLE8 | COMPARATIVE EXAMPLE9 | COMPARATIVE EXAMPLE10 | COMPARATIVE EXAMPLE11 | COMPARATIVE EXAMPLE12 | COMPARATIVE EXAMPLE13 | COMPARATIVE EXAMPLE14 |
|---|---|---|---|---|---|---|---|---|---|---|---|---|---|---|---|---|
| RAW MATERIAL COMPOSITION | FORMULATION | | FORMULATION 1 | FORMULATION 1 | FORMULATION 2 | FORMULATION 2 | FORMULATION 2 | FORMULATION 3 | FORMULATION 4 | FORMULATION 5 | FORMULATION 6 | FORMULATION 7 | ACRYLIC RESIN | ACRYLIC RESIN | ACRYLIC RESIN | FORMULATION 1 |
| | RESIN | TPC-I | 80 | 80 | 80 | 80 | 80 | 70 | 40 | — | — | — | | | | 80 |
| | | TPC-II | — | — | — | — | — | — | — | 20 | 20 | — | | | | — |
| | | TPC-III | — | — | — | — | — | — | 25 | 30 | 30 | — | | | | — |
| | | TPC-IV | — | — | — | — | — | — | — | 20 | 20 | — | | | | — |
| | | LLDPE-I | 20 | 20 | 20 | 20 | 20 | 30 | 30 | 25 | 25 | — | | | | 20 |
| | | LLDPE-II | — | — | — | — | — | — | — | — | — | 100 | | | | — |
| | | RANDOM PP | — | — | — | — | — | — | 5 | 5 | 5 | — | | | | — |
| | CROSSLINKING AID | TMPTMA | 2 | 2 | — | — | — | 2 | — | 2 | — | — | | | | 2 |
| DECORATIVE RESIN SHEET | ELECTRON BEAM IRRADIATION CONDITION | ACCELERATING VOLTAGE (kV) | 0 | 200 | 0 | 200 | 200 | 0 | 0 | 0 | 0 | 0 | 0 | 200 | 200 | 0 |
| | | IRRADIATION DOSE (kGy) | 0 | 50 | 0 | 50 | 100 | 0 | 0 | 0 | 0 | 0 | 0 | 100 | 200 | 300 |
| | AVERAGE THICKNESS OF DECORATIVE RESIN SHEET (μm) | | 280 | 320 | 280 | 280 | 280 | 300 | 280 | 290 | 270 | 300 | 250 | 250 | 250 | 300 |
| | R_JIS OF EMBOSSMENT (μm) | | 90 | 90 | 100 | 100 | 100 | 90 | 110 | 110 | 100 | 100 | 100 | 100 | 100 | 100 |
| | 100% MODULUS (MPa) | | NA | 0.013 | NA | 0.011 | 0.016 | NA | 0.001 | 0.003 | 0.005 | NA | NA | NA | NA | NA |
| | REMARK | | — | — | — | — | — | — | — | — | — | — | — | — | — | FORMATION OF COATING LAYER OF UV CROSSLINKABLE RESIN |
| INJECTION MOLDING | RELEASABILITY | | × | ○ | × | ○ | ○ | × | × | × | × | ○ | ×× | ×× | ×× | × |
| | EMBOSSMENT TRANSFERABILITY | | × | × | × | × | × | × | × | × | × | × | — | — | — | × |

FIG.13

| RAW MATERIAL COMPOSITION | | | EXAMPLE14 FORMULATION | EXAMPLE15 FORMULATION | EXAMPLE16 FORMULATION | EXAMPLE17 FORMULATION | EXAMPLE18 FORMULATION | EXAMPLE19 FORMULATION | COMPARATIVE EXAMPLE15 FORMULATION 4 |
|---|---|---|---|---|---|---|---|---|---|
| DECORATIVE RESIN SHEET | RESIN | TPO-I | 40 | 40 | 40 | 40 | 40 | 40 | 40 |
| | | TPO-II | — | — | — | — | — | — | — |
| | | TPO-III | 25 | 25 | 25 | 25 | 25 | 25 | 25 |
| | | TPO-IV | — | — | — | — | — | — | — |
| | | LLDPE-I | 30 | 30 | 30 | 30 | 30 | 30 | 30 |
| | | RANDOM PP | 5 | 5 | 5 | 5 | 5 | 5 | 5 |
| | CROSSLINKING AID | TMPTMA | — | — | — | — | — | — | — |
| | ELECTRON BEAM IRRADIATION CONDITION | ACCELERATING VOLTAGE (kV) | 200 | 200 | 200 | 200 | 200 | 200 | 0 |
| | | IRRADIATION DOSE (kGy) | 50 | 75 | 100 | 200 | 300 | 400 | 0 |
| | AVERAGE THICKNESS OF DECORATIVE RESIN SHEET (μm) | | 220 | 230 | 220 | 240 | 240 | 230 | 230 |
| | R₂jis OF EMBOSSMENT (μm) | | 80 | 80 | 80 | 80 | 80 | 80 | 80 |
| | 100% MODULUS (MPa) | | 0.039 | 0.055 | 0.082 | 0.142 | 0.220 | 0.244 | NA |
| INJECTION MOLDING | HDPE | RELEASABILITY | ○ | ○ | ○ | ○ | ○ | ○ | ×× |
| | | EMBOSSMENT TRANSFERABILITY | ○ | ○ | ○ | ○ | ○ | ○ | — |
| | PP | RELEASABILITY | ○ | ○ | ○ | ○ | ○ | ○ | ×× |
| | | EMBOSSMENT TRANSFERABILITY | ○ | ○ | ○ | ○ | ○ | ○ | — |
| | ABS | RELEASABILITY | ○ | ○ | ○ | ○ | ○ | ○ | × |
| | | EMBOSSMENT TRANSFERABILITY | ○ | ○ | ○ | ○ | ○ | ○ | × |
| | PC/ABS | RELEASABILITY | ○ | ○ | ○ | ○ | ○ | ○ | × |
| | | EMBOSSMENT TRANSFERABILITY | ○ | ○ | ○ | ○ | ○ | ○ | × |
| | PC/PET-I | RELEASABILITY | ○ | ○ | ○ | ○ | ○ | ○ | × |
| | | EMBOSSMENT TRANSFERABILITY | ○ | ○ | ○ | ○ | ○ | ○ | × |
| | PC/PET-II | RELEASABILITY | ○ | ○ | ○ | ○ | ○ | ○ | × |
| | | EMBOSSMENT TRANSFERABILITY | ○ | ○ | ○ | ○ | ○ | ○ | × |

FIG.14

| MOLDING RESIN | | HDPE | PP | ABS | PC/ABS | PC/PET-I | PC/PET-II |
|---|---|---|---|---|---|---|---|
| INJECTION MOLDING CONDITION | CYLINDER TEMPERATURE(°C) | 190 | 200 | 230 | 240 | 270 | 270 |
| | NOZZLE TEMPERATURE(°C) | 200 | 210 | 240 | 250 | 275 | 275 |
| | INJECTION PRESSURE(MPa) | 200 | 200 | 200 | 200 | 200 | 200 |
| | INJECTION SPEED (MM/SEC) | 100 | 100 | 100 | 100 | 100 | 100 |
| | INJECTION TIME (SEC) | 8 | 8 | 8 | 8 | 8 | 8 |
| | DIE TEMPERATURE(°C) | 30 | 30 | 50 | 50 | 70 | 70 |
| | COOLING TIME(SEC) | 25 | 25 | 25 | 25 | 25 | 25 |

FIG.15

| | | | EXAMPLE20 | EXAMPLE21 | EXAMPLE22 | EXAMPLE23 | COMPARATIVE EXAMPLE6 |
|---|---|---|---|---|---|---|---|
| DECORATIVE RESIN SHEET | RAW MATERIAL COMPOSITION | FORMULATION | FORMULATION4 | FORMULATION4 | FORMULATION4 | FORMULATION4 | FORMULATION4 |
| | | RESIN TPO-I | 40 | 40 | 40 | 40 | 40 |
| | | TPO-II | — | — | — | — | — |
| | | TPO-III | 25 | 25 | 25 | 25 | 25 |
| | | TPO-IV | — | — | — | — | — |
| | | LLDPE-I | 30 | 30 | 30 | 30 | 30 |
| | | RANDOM PP | 5 | 5 | 5 | 5 | 5 |
| | | CROSSLINKING AID TMPTMA | — | — | — | — | — |
| | ELECTRON BEAM IRRADIATION CONDITION | ACCELERATING VOLTAGE(kV) | 200 | 200 | 200 | 200 | 0 |
| | | IRRADIATION DOSE(kGy) | 100 | 200 | 300 | 400 | 0 |
| | AVERAGE THICKNESS OF DECORATIVE RESIN SHEET(μm) | | 220 | 240 | 240 | 230 | 230 |
| | R$_{zJIS}$ OF EMBOSSMENT(μm) | | 80 | 80 | 80 | 80 | 80 |
| | 100%MODULUS(MPa) | | 0.082 | 0.142 | 0.220 | 0.244 | NA |
| INJECTION MOLDING | RELEASABILITY | | ○ | ○ | ○ | ○ | × |
| | EMBOSSMENT TRANSFERABILITY | | ○ | ○ | ○ | ○ | × |

FIG.17

| | | | EXAMPLE | | | | | | | | | | | | COMPARATIVE EXAMPLE | | |
|---|---|---|---|---|---|---|---|---|---|---|---|---|---|---|---|---|---|
| | | | 24 | 25 | 26 | 27 | 28 | 29 | 30 | 31 | 32 | 33 | 34 | 35 | 36 | 37 | 17 | 18 | 19 |
| RAW MATERIAL COMPOSITION | FORMULATION | TPO-I | 10 | 10 | 10 | — | — | 35 | 35 | 35 | 35 | 35 | 35 | 35 | 35 | 35 | 35 | 35 | 35 |
| | | TPO-II | — | — | — | — | — | — | — | — | — | — | — | — | — | — | — | — | — |
| | | TPO-III | — | — | — | 20 | 20 | — | — | — | — | — | — | — | — | — | — | — | — |
| | | TPO-IV | 25 | 25 | 25 | 30 | 30 | — | — | — | — | — | — | — | — | — | — | — | — |
| | RESIN | LLDPE-I | — | — | — | 20 | 20 | 10 | 10 | 10 | 10 | 10 | 10 | 10 | 10 | 10 | 10 | 10 | 10 |
| | | LLDPE-III | 30 | 30 | 30 | 25 | 25 | 50 | 50 | 50 | 50 | 50 | 50 | 50 | 50 | — | 50 | 50 | 50 |
| | | HOMO PP | — | — | — | — | — | — | — | — | — | — | — | — | — | 50 | — | — | — |
| | | RANDOM PP | — | — | — | — | — | — | — | — | — | — | — | — | — | — | — | — | — |
| | CROSSLINKING AID | TMPTMA | 5 | 5 | 5 | 5 | 5 | 5 | 5 | 5 | 5 | 5 | 5 | 5 | 5 | 5 | 5 | 5 | 5 |
| | | CROSSLINKING CATALYST | 2 | 2 | 2 | 2 | — | 2 | — | — | — | 2 | 2 | 2 | 2 | — | 2 | 2 | 2 |
| | | PROTECTIVE LAYER | — | — | — | — | — | — | 3 | 3 | 3 | — | — | — | — | 0.05 | 3 | — | — |
| DECORATIVE RESIN SHEET | TRANSFER LAYER THICKNESS (μm) | PATTERN LAYER | 5 | 5 | 5 | 5 | 5 | 5 | 5 | 5 | 5 | 5 | 5 | 5 | 5 | 5 | 5 | 5 | 5 |
| | | ADHESION LAYER | 5 | 5 | 5 | 5 | 5 | 5 | 5 | 5 | 5 | 5 | — | 5 | 5 | 5 | 5 | — | 5 |
| | | TOTAL A | 15 | 15 | 15 | 15 | 15 | 15 | 10 | 10 | 10 | 10 | 10 | 10 | 10 | 15 | 10 | 10 | 10 |
| | ELECTRON BEAM IRRADIATION CONDITION | ACCELERATING VOLTAGE(kV) | 200 | 200 | 200 | 200 | 200 | 200 | 200 | 200 | 200 | 200 | 200 | 200 | 200 | 0 | 0 | 0 | 0 |
| | | IRRADIATION DOSE(kGy) | 200 | 300 | 400 | 200 | 200 | 200 | 200 | 200 | 400 | 200 | 200 | 200 | 200 | 0 | 0 | 0 | 0 |
| | AVERAGE THICKNESS B OF DECORATIVE RESIN SHEET B(μm) | | 250 | 250 | 250 | 300 | 290 | 360 | 350 | 350 | 330 | 350 | 340 | 340 | 350 | 340 | 350 | 340 | 340 |
| | AVERAGE THICKNESS (B−A) OF MOLD LAYER(μm) | | 235 | 235 | 235 | 285 | 275 | 345 | 340 | 340 | 320 | 340 | 330 | 330 | 335 | 325 | 340 | 330 | 330 |
| | R₂JS OF EMBOSSMENT (μm) | | 180 | 170 | 180 | 190 | 180 | 180 | 100 | 130 | 100 | 130 | 180 | 180 | 180 | 180 | 180 | 180 | 180 |
| | 100% MODULUS(MPa) | | 0.140 | 0.250 | 0.100 | 0.320 | 0.280 | 0.100 | 0.105 | 0.095 | 0.220 | 0.210 | 0.105 | 0.105 | 0.085 | 0.100 | NA | NA | NA |
| INJECTION MOLDING | RELEASABILITY | | ○ | ○ | ○ | ○ | ○ | ○ | ○ | ○ | ○ | ○ | ○ | ○ | ○ | ○ | ○ | ○ | ○ |
| | EMBOSSMENT TRANSFERABILITY | | ○ | ○ | ○ | ○ | ○ | ○ | ○ | ○ | ○ | ○ | ○ | ○ | ○ | ○ | × | × | × |
| | TRANSFER LAYER TRANSFERABILITY | | ○ | ○ | ○ | ○ | ○ | ○ | ○ | ○ | ○ | ○ | ○ | ○ | ○ | ○ | × | × | × |
| REMARK | | | | | | | | | | | | | | | IRRADIATION OF ELECTRON BEAM FROM AN OPPOSITE SIDE OF EMBOSSED SURFACE | IMMERSION IN HOT WATER AT 80°C FOR 6 HOURS | | | |

FIG.18

| | | | EXAMPLE38 | EXAMPLE39 | EXAMPLE40 | EXAMPLE41 | COMPARATIVE EXAMPLE20 |
|---|---|---|---|---|---|---|---|
| DECORATIVE RESIN SHEET | RAW MATERIAL COMPOSITION | FORMULATION | FORMULATION 9 | FORMULATION 9 | FORMULATION 9 | FORMULATION 9 | FORMULATION 9 |
| | | RESIN TPO-I | 35 | 35 | 35 | 35 | 35 |
| | | TPO-II | — | — | — | — | — |
| | | TPO-III | — | — | — | — | — |
| | | TPO-IV | 10 | 10 | 10 | 10 | 10 |
| | | LLDPE-I | 50 | 50 | 50 | 50 | 50 |
| | | HOMO PP | 5 | 5 | 5 | 5 | 5 |
| | | RANDOM PP | — | — | — | — | — |
| | CROSSLINKING AID | TMPTMA | 2 | 2 | 2 | 2 | 2 |
| | TRANSFER LAYER THICKNESS ($\mu m$) | PROTECTIVE LAYER | 3 | 3 | 3 | 3 | 3 |
| | | PATTERN LAYER | 5 | 5 | 5 | 5 | 5 |
| | | ADHESION LAYER | 2 | 2 | 2 | 2 | 2 |
| | | TOTAL A | 10 | 10 | 10 | 10 | 10 |
| | ELECTRON BEAM IRRADIATION CONDITION | ACCELERATING VOLTAGE(kV) | 200 | 200 | 200 | 200 | 0 |
| | | IRRADIATION DOSE(kGy) | 200 | 200 | 400 | 400 | 0 |
| | AVERAGE THICKNESS B OF DECORATIVE RESIN SHEET B($\mu m$) | | 350 | 350 | 330 | 350 | 350 |
| | AVERAGE THICKNESS (B-A) OF MOLD LAYER($\mu m$) | | 340 | 340 | 320 | 340 | 340 |
| | $R_{zJIS}$ OF EMBOSSMENT($\mu m$) | | 100 | 130 | 100 | 130 | 130 |
| | 100% MODULUS(MPa) | | 0.105 | 0.095 | 0.220 | 0.210 | NA |
| INJECTION MOLDING | RELEASABILITY | | ○ | ○ | ○ | ○ | ○ |
| | EMBOSSMENT TRANSFERABILITY | | ○ | ○ | ○ | ○ | × |
| | TRANSFER LAYER TRANSFERABILITY | | ○ | ○ | ○ | ○ | × |

DECORATIVE RESIN SHEET, AND MOLDED RESIN ARTICLE AND PROCESS FOR PRODUCTION THEREOF

CROSS REFERENCE TO RELATED APPLICATIONS

This application is a National Stage of International Application No. PCT/JP2011/070220, filed on Sep. 6, 2011, which claims priority from Japanese Patent Application Nos. 2010-225406, filed on Oct. 5, 2010 and JP 2011-161241, filed Jul. 22, 2011, the contents of all of which are incorporated herein by reference in their entirety.

TECHNICAL FIELD

The present invention relates to a decorative resin sheet, and a molded resin article, and a method of manufacturing the molded resin article, and more particularly, to manufacture of an injection-molded article which is embossed by transfer from a decorative resin sheet.

BACKGROUND ART

A molded resin article manufactured by injection molding has been mainly used in an automobile part (e.g., an interior material), or in a part (e.g., a casing) for a home appliance such as a notebook computer or a cellular phone. In addition, a molded resin article whose design is improved by embossing its surface is preferably used as such molded resin article.

For example, hitherto, a method involving performing injection molding with an injection molding die having an embossed inner surface as a result of etching or engraving has been available as a method of manufacturing, by injection molding, a molded resin article on which an embossment is formed.

In the method involving using such specific injection molding die, however, for example, in a case where various molded resin articles having different embossed shapes are manufactured, various dies corresponding to the respective embossed shapes need to be provided. Accordingly, large amounts of labor and costs are required, and hence efficient manufacture has been difficult.

In view of the foregoing, a method where injection molding is performed by placing a resin sheet on which an embossment is formed in an injection molding die, and then the resin sheet is peeled from a formed molded resin article, has been proposed (for example, Patent Literature 1 and Patent Literature 2).

CITATION LIST

Patent Literature

Patent Literature 1: JP63-224918A
Patent Literature 2: JP2-103136A

SUMMARY OF INVENTION

Technical Problem

However, none of the resin sheets to be placed in injection molding dies has sufficiently brought together a characteristic by which a desired embossment is easily formed on its surface (hereinafter, referred to as "embossing property"), and a characteristic by which the embossment is accurately transferred onto a molded resin article under high temperature and high pressure at the time of injection molding (hereinafter, referred to as "embossment-retaining property") so far.

That is, the heat resistance of a resin sheet needs to be improved for improving the embossment-retaining property. In general, however, improving the heat resistance of the resin sheet makes it difficult to form an embossment on its surface, thereby impairing the embossing property. In contrast, improving the embossing property of the resin sheet reduces its heat resistance, thereby impairing the embossment-retaining property.

The present invention has been made in view of the problems, and an object of the present invention is to provide a decorative resin sheet that sufficiently brings together embossing property and embossment-retaining property, and a molded resin article on which an embossment with excellent design is formed and a method of manufacturing the molded resin article.

Solution to Problem

In order to solve the above-mentioned problem, according to an exemplary embodiment of the present invention, there is provided a method of manufacturing a molded resin article, including: an embossment-forming step of providing a resin sheet having a mold layer containing a polyolefin-based resin as a main component, followed by formation of an embossment on the resin sheet so that the embossment is formed on a surface of the mold layer; a crosslinking step of crosslinking the mold layer on which the embossment is formed so that a 100% modulus of the resin sheet at 200° C. becomes 0.02 MPa or more, which is measured in conformity with JIS K6251 (2004 version); a placing step of placing the resin sheet obtained in the crosslinking step in an injection molding die so that the surface of the mold layer faces a side from which a molten resin is injected; a molding step of injecting the molten resin onto a side of the surface of the mold layer in the injection molding die to mold a molded resin article; and a separating step of separating the molded resin article and the mold layer. According to the present invention, there is provided a method of manufacturing a molded resin article on which an embossment with excellent design is formed.

Further, in the crosslinking step, the mold layer may be crosslinked so that the 100% modulus of the resin sheet becomes 0.02 MPa or more by irradiating the mold layer on which the embossment is formed with an energy ray from the side of the surface of the mold layer and/or an opposite side of the surface of the mold layer.

Further, in the embossment-forming step, the resin sheet to be provided may further have a transfer layer laminated on the side of the surface of the mold layer, and the embossment may be formed on the resin sheet so that the embossment is formed on a surface of the transfer layer and the surface of the mold layer. In the separating step, the transfer layer adhering to the molded resin article and the mold layer may be separated. In this case, in the embossment-forming step, the emboss having a ten-point average roughness ($R_{zJIS}$), which is measured in conformity with JIS B0601-2001, larger than a thickness of the transfer layer may be formed. Further, the transfer layer may have a thickness of 0.5 μm to 150 μm. Further, the transfer layer may include a protective layer and/or a pattern layer. Further, in the embossment-forming step, the resin sheet to be provided may be constituted only of the mold layer and the embossment may be formed on the surface of the mold layer.

Further, in the embossment-forming step, the embossment having a ten-point average roughness ($R_{zJIS}$) of 10 μm to 400 μm, which is measured in conformity with JIS B0601-2001, may be formed.

In order to solve the above-mentioned problem, according to another exemplary embodiment of the present invention, there is provided a decorative resin sheet, including a mold layer having a surface on which an embossment is formed and containing a polyolefin-based resin as a main component, in which the decorative resin sheet has a 100% modulus at 200° C. of 0.02 MPa or more, which is measured in conformity with JIS K6251 (2004 version). According to the present invention, there is provided a decorative resin sheet that sufficiently brings together embossing property and embossment-retaining property.

Further, the mold layer may be crosslinked by energy ray irradiation. Further, any one of the above-mentioned decorative resin sheets may further include a transfer layer laminated on a side of the surface of the mold layer, in which an embossment corresponding to the embossment of the mold layer is formed on a surface of the transfer layer as well. In this case, the embossment may have a ten-point average roughness ($R_{zJIS}$), which is measured in conformity with JIS B0601-2001, larger than a thickness of the transfer layer. Further, the transfer layer may have a thickness of 0.5 μm to 150 μm. Further, the transfer layer may include a protective layer and/or a pattern layer. Further, the decorative resin sheet may be constituted only by the mold layer.

Further, in any one of the above-mentioned decorative resin sheets, the embossment may have a ten-point average roughness ($R_{zJIS}$) of 10 μm to 400 μm, which is measured in conformity with JIS B0601-2001.

In order to solve the above-mentioned problem, according to another exemplary embodiment of the present invention, there is provided a method of manufacturing a molded resin article, including: a placing step of placing any one of the above-mentioned decorative resin sheets in an injection molding die so that the surface of the mold layer faces a side from which a molten resin is injected; a molding step of injecting the molten resin onto the side of the surface of the mold layer in the injection molding die to mold a molded resin article; and a separating step of separating the molded resin article and the mold layer. According to the present invention, there is provided a method of manufacturing a molded resin article on which an embossment with excellent design is formed.

In order to solve the above-mentioned problem, according to another exemplary embodiment of the present invention, there is provided a molded resin article, which is manufactured by any one of the above-mentioned methods, the molded resin article including a surface on which an embossment is formed. According to the present invention, there is provided a method of manufacturing a molded resin article on which an embossment with excellent design is formed.

Advantageous Effects of Invention

According to the present invention, there is provided a decorative resin sheet that sufficiently brings together embossing property and embossment-retaining property, and the molded resin article on which an embossment with excellent design is formed, and a method of manufacturing the molded resin article.

BRIEF DESCRIPTION OF DRAWINGS

FIG. 11 An explanatory diagram showing the manufacture of a decorative resin sheet and the results of injection molding performed with the sheet in each of Examples 1 to 13 according to an embodiment of the present invention.

FIG. 12 An explanatory diagram showing the manufacture of a decorative resin sheet and the results of injection molding performed with the sheet in each of Comparative Examples 1 to 14 according to an embodiment of the present invention.

FIG. 13 An explanatory diagram showing the manufacture of a decorative resin sheet and the results of injection molding performed with the sheet in each of Examples 14 to 19 and Comparative Example 15 according to an embodiment of the present invention.

FIG. 14 An explanatory diagram showing a molding resin used in each of Examples 1 to 19 and Comparative Examples 1 to 15 according to the embodiment of the present invention, and injection molding conditions for the resin.

FIG. 15 An explanatory diagram showing the manufacture of a decorative resin sheet and the results of injection molding performed with the sheet in each of Examples 20 to 23 and Comparative Example 16 according to an embodiment of the present invention.

FIG. 17 An explanatory diagram showing the manufacture of a decorative resin sheet and the results of injection molding performed with the sheet in each of Examples 24 to 37 and Comparative Examples 17 to 19 according to an embodiment of the present invention.

FIG. 18 An explanatory diagram showing the manufacture of a decorative resin sheet and the results of injection molding performed with the sheet in each of Examples 38 to 41 and Comparative Example 20 according to an embodiment of the present invention.

DESCRIPTION OF EMBODIMENTS

Figure 1:
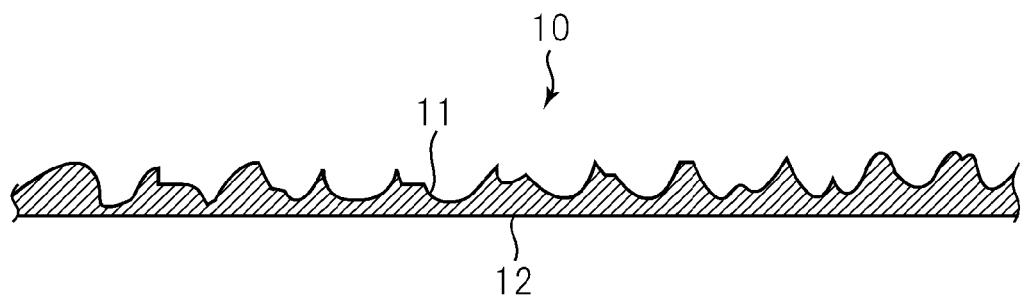
FIG. 1 A sectional view concerning an example of a decorative resin sheet according to an embodiment of the present invention.

Hereinafter, an embodiment of the present invention will be described. It should be noted that the present invention is not limited to this embodiment.

A decorative resin sheet (hereinafter, referred to as "decorative sheet") according to this embodiment is a sheet made of a resin having a surface on which an embossment is formed (hereinafter, referred to as "embossed surface"), and is a decorative resin sheet for transferring an embossment at the time of injection molding to be used for transferring the embossment onto the surface of a molded resin article in the injection molding.

That is, the decorative sheet is placed in an injection molding die so that its embossed surface faces a cavity side (side from which a molten resin is injected), and then the embossed surface is pressed against the surface of the injected molten resin at high temperature and high pressure. As a result, a molded resin article on which an embossment corresponding to the embossed surface is formed is obtained.

For this reason, the decorative sheet according to the present invention, which is specialized for a special application of injection molding, brings together excellent embossing property for having an embossed surface on which an embossment with excellent design is formed, and excellent embossment-retaining property for accurately transferring the embossment with excellent design onto a molded resin article under high temperature and high pressure at the time of the injection molding. Further, the decorative sheet has excellent releasability at the time of the injection molding.

The decorative sheet has a resin layer containing a polyolefin-based resin as a main component (hereinafter, referred to as "mold layer") and the mold layer has an embossed surface. The embossed surface of the mold layer is a surface on one side of the mold layer and is a surface on which an embossment is formed.

The decorative sheet is a sheet having the mold layer containing the polyolefin-based resin as a main component, the layer having the surface on which the embossment is formed (embossed surface), and having a 100% modulus at 200° C. of 0.02 MPa or more, which is measured in conformity with JIS K6251 (2004 version).

Here, the 100% modulus of the decorative sheet is a tensile stress at a tensile elongation of 100% when the tension test of the decorative sheet is performed at 200° C. by a method in conformity with JIS K6251 (2004 version).

In a case where the 100% modulus of the decorative sheet is 0.02 MPa or more, the decorative sheet has an excellent embossment-retaining property even under high temperature and high pressure at the time of injection molding. Therefore, injection molding involving using the decorative sheet achieves efficient manufacture of a molded resin article on which an embossment with excellent design is formed.

Although an upper limit for the 100% modulus of the decorative sheet is not particularly limited, the 100% modulus of the decorative sheet may be set to, for example, 0.02 MPa or more and 5 MPa or less. In addition, the 100% modulus of the decorative sheet is preferably 0.04 MPa or more, more preferably 0.08 MPa or more.

The 100% modulus of the decorative sheet of 0.02 MPa or more is achieved by crosslinking the mold layer (at least the polyolefin-based resin contained in the embossed surface of the mold layer) as described later. The crosslinking of the mold layer is, for example, crosslinking by irradiation using an energy ray (energy ray crosslinking).

The energy ray is not particularly limited as long as the ray forms a new crosslinked structure in resins (at least the polyolefin-based resin) and imparts moderate rubber elasticity to the resin sheet (at least the mold layer). For example, one or more kinds selected from the group consisting of an electron beam, a γ-ray, UV light, and visible light may be used, and an electron beam may be preferably used.

In addition, a crosslinking reaction does not need to be performed by the energy ray irradiation and may be performed by any other crosslinking method such as chemical crosslinking, as long as the object of the present invention is achieved. That is, the 100% modulus of 0.02 MPa or more may be achieved by, for example, the energy ray crosslinking and/or the chemical crosslinking. For example, peroxide crosslinking and/or silane crosslinking may be employed as the chemical crosslinking.

In the peroxide crosslinking, a resin is crosslinked with free radicals generated by adding peroxide to the resin and thermally decomposing the peroxide. In the silane crosslinking, a resin is crosslinked by grafting the resin with a silane compound and bringing the resultant into contact with moisture.

In a case where such crosslinking that the 100% modulus of the decorative sheet becomes 0.02 MPa or more is performed by, for example, energy ray irradiation, the crosslinking is achieved by adjusting conditions (such as an irradiation dose) for the energy ray irradiation. In addition, in a case where chemical crosslinking is performed, only reaction conditions for the chemical crosslinking have to be adjusted. It should be noted that crosslinking by the energy ray irradiation and the chemical crosslinking may be employed in combination. A crosslinking condition under which the 100% modulus becomes 0.02 MPa or more may be determined by investigating, for example, a correlation between a plurality of crosslinking conditions and the 100% modulus of decorative sheets to be obtained under the respective plurality of crosslinking conditions. That is, such a crosslinking condition that the 100% modulus of a decorative sheet to be obtained becomes 0.02 MPa or more may be determined by investigating how the 100% modulus of the decorative sheet changes, for example, in cases where the composition of a resin constituting a mold layer and/or a condition (such as an accelerating voltage or an irradiation dose) for energy ray irradiation are changed.

In the decorative sheet, for example, the mold layer may have an embossed surface containing a polyolefin-based resin crosslinked by energy ray irradiation. That is, in this case, the decorative sheet is a resin sheet having the 100% modulus at 200° C. of 0.02 MPa or more, which is measured in conformity with JIS K6251 (2004 version), and has the mold layer containing the polyolefin-based resin as a main component, and the mold layer has a surface on which an embossment is formed and which contains the polyolefin-based resin crosslinked by the energy ray irradiation.

The mold layer of the decorative sheet contains the polyolefin-based resin as a main component and hence the sheet has excellent embossing property. In addition, the sheet obtains rubber elasticity based on a crosslinked structure formed in the polyolefin-based resin by the energy ray irradiation and hence has an excellent embossment-retaining property even at high temperature and high pressure.

That is, in this case, in the manufacture of the decorative sheet, a polyolefin-based resin as a thermoplastic resin that causes a crosslinking reaction through energy ray irradiation is used. In addition, the irradiation of the polyolefin-based resin with an energy ray results in the formation of a new crosslinked structure in the polyolefin-based resin, thereby imparting moderate rubber elasticity to the decorative sheet.

It should be noted that the phrase "the mold layer of the decorative sheet contains the polyolefin-based resin as a main component" means that the content of the polyolefin-based resin with respect to the entirety of the resin components in the mold layer is 50 wt % or more.

Although the content of the polyolefin-based resin in the mold layer is not particularly limited as long as the content is 50 wt % or more, for example, the content may be set to 70 wt % or more, and may be set to 80 wt % or more. Increasing the content of the polyolefin-based resin in the mold layer may effectively improve the embossing property and embossment-retaining property of the decorative sheet.

The polyolefin-based resin crosslinked by the energy ray irradiation in the decorative sheet is not particularly limited as long as the resin contains a crosslinked structure formed by the energy ray irradiation.

Here, the polyolefin-based resin is a synthetic resin containing an alkene (general formula: $C_nH_{2n}$ (n represents an integer of 2 or more)) as a main component. The polyolefin-based resin may contain a monomer other than the alkene, as a copolymer component or a graft component.

The polyolefin-based resin may be, for example, one or more kinds selected from the group consisting of a polyolefin-based elastomer (such as a polyolefin-based elastomer containing polyethylene and/or polypropylene as a hard segment), a polyethylene-based resin obtained by polymerizing a monomer containing ethylene as a main component, and a polypropylene-based resin obtained by polymerizing a monomer containing propylene as a main component. That is, in this case, the mold layer of the decorative sheet contains, as a main component, for example, one or more kinds selected from the group consisting of a polyolefin-based elastomer, a polyethylene-based resin, and a polypropylene-based resin each of which has been crosslinked using an energy ray.

The polyolefin-based elastomer is not particularly limited as long as the elastomer is used for forming the mold layer of the decorative sheet by a method such as calendering or extrusion molding, and is, for example, one or more kinds selected from the group consisting of: a dynamically crosslinked polyolefin-based thermoplastic elastomer (dynamically crosslinked TPO) obtained by dynamic crosslinking of a blend of an olefin-based hard segment of polyethylene, polypropylene, or the like and a soft segment such as a butadiene-based, styrene-butadiene-based, or ethylene-propylene-based soft segment; a reactor polyolefin-based thermoplastic elastomer (reactor TPO) obtained by multistage polymerization of a monomer of an olefin-based hard segment of polyethylene, polypropylene, or the like and a monomer of a soft segment such as a butadiene-based, styrene-butadiene-based, or ethylene-propylene-based soft segment; and a blend-type polyolefin-based thermoplastic elastomer (blend-type TPO) obtained by physically dispersing one or more kinds of polymers which are olefin-based hard segments of polyethylene, polypropylene, and the like and one or more kinds of polymers which are soft segments such as butadiene-based, styrene-butadiene-based, and ethylene-propylene-based soft segments. It should be noted that the hard segment is a polymer or part of a polymer having resin-like properties, and the soft segment is a polymer or part of a polymer having rubber-like properties.

The polyethylene-based resin is not particularly limited as long as the resin is used for forming the mold layer of the decorative sheet by a method such as calendering or extrusion molding, and is, for example, one or more kinds selected from the group consisting of a low molecular weight polyethylene resin, a low density polyethylene resin, a medium density polyethylene resin, a high density polyethylene resin, an ultra-high molecular weight polyethylene resin, and a linear low density polyethylene resin. The polypropylene-based resin is not particularly limited as long as the resin is used for forming the mold layer of the decorative sheet by a method such as calendering or extrusion molding, and for example, a polypropylene-based resin having any molecular structure such as an isotactic structure, a syndiotactic structure, or an atactic structure may be used. The polypropylene-based resin may be a homopolymer, or may be a random copolymer or block copolymer (such as a polymer containing ethylene or butene-1 in its molecular chain).

The mold layer of the decorative sheet may further contain any other resin. The kind and content of such other resin is not particularly limited as long as the embossing property and embossment-retaining property (in particular, heat resistance) of the decorative sheet are not impaired. That is, as such other resin, for example, there may be preferably used a thermoplastic resin of a kind different from the polyolefin-based resin as a main component. More specifically, as such other resin, there may be used, for example, one or more kinds selected from the group consisting of a polystyrene-based resin, a polyvinyl chloride-based resin, an acrylic resin, a polyester-based resin, a polycarbonate-based resin, a polyamide-based resin, and a thermoplastic elastomer, and there may be preferably used one or both of a polystyrene-based resin and a polyvinyl chloride-based resin capable of being subjected to energy ray crosslinking and chemical crosslinking. It should be noted that such other resin is preferably crosslinkable by irradiation using an energy ray and/or chemical crosslinking, but is not necessarily limited thereto.

The mold layer of the decorative sheet may further contain an additive. The additive is not particularly limited as long as the embossing property and embossment-retaining property of the decorative sheet are not impaired, and for example, an additive to be generally added to a thermoplastic resin may be used. That is, for example, one or more kinds selected from the group consisting of a crosslinking aid, a stabilizer, an antioxidant, a UV absorber, a plasticizer, a lubricant, an antistatic agent, and a filler may be used as the additive.

In a case where energy ray crosslinking is performed, the crosslinking aid is not particularly limited as long as the crosslinking aid promotes a crosslinking reaction through energy ray irradiation, and for example, a monounsaturated compound or a polyunsaturated compound may be used. In a case where chemical crosslinking is performed, the crosslinking aid is not particularly limited as long as the crosslinking aid promotes a chemical crosslinking reaction, and for example, a crosslinking catalyst such as a tin catalyst, a titanium catalyst, or an aluminum catalyst may be used in silane crosslinking.

As the crosslinking aid in the case of carrying out electron beam irradiation, there may be used, for example, one or more kinds selected from the group consisting of an acrylate of a monohydric or polyhydric alcohol (such as trimethylolpropane triacrylate), a methacrylate of a monohydric or polyhydric alcohol (such as trimethylolpropane trimethacrylate), a vinyl-based compound (such as styrene or vinylbenzoyl), an allyl compound (such as triallyl cyanurate or triallyl isocyanurate), sulfur, p-quinone dioxime, N-methyl-N,4-dinitrosoaniline, nitrobenzol, diphenylguanidine, and trimethylolpropane-N,N'-m-phenylenedimaleimide.

Although the shape of the embossment to be formed on the embossed surface of the decorative sheet is not particularly limited as long as the shape has concavity and convexity to be transferred onto the surface of a molded resin article, the emboss is preferably an embossment that has concavity and convexity each having a relatively large depth and that provides the molded resin article with an excellent design.

That is, for example, the ten-point average roughness ($R_{zJIS}$) of the embossment, which is measured in conformity with JIS B0601-2001, is preferably 10 μm to 400 μm, more preferably 25 μm to 250 μm.

Here, the ten-point average roughness ($R_{zJIS}$) refers to the following value. Only a sampling length is sampled from a roughness curve in the direction of its average line. The sum of the average of the absolute values of the altitudes (Yp's) of the highest peak to the fifth highest peak measured in the direction of a longitudinal magnification from the average line of the sampled portion and the average of the absolute values of the altitudes (Yv's) of the lowest valley to the fifth lowest valley similarly measured is determined. The determined value is represented in unit of micrometers (μm).

In a case where the $R_{zJIS}$ of the embossment formed on the embossed surface falls within the range, the decorative sheet accurately provides a molded resin article with an embossment that has three-dimensional concavity and convexity each having a sufficient depth and that is excellent in design.

The average thickness of the decorative sheet, which is not particularly limited, may be set to, for example, 100 μm to 500 μm. In a case where the average thickness of the decorative sheet is 100 μm to 500 μm, for example, the embossment to be formed on its embossed surface has three-dimensional concavity and convexity each having a sufficient depth. As a result, a molded resin article is provided with the embossment with excellent design. In addition, in this case, the decorative sheet has mechanical strength sufficient to withstand high temperature and high pressure at the time of injection molding. In addition, for example, in a case where a molded resin article having a bent portion is injection-molded, the decorative sheet sufficiently follows the bent portion and hence accurately provides the bent portion with the embossment.

In addition, the decorative sheet may have the average thickness of 100 μm to 500 μm and the ten-point average roughness ($R_{zJIS}$) of its embossment of 10 μm to 400 μm. In this case, in injection molding, the decorative sheet follows the surface having an arbitrary shape of a molded resin article and hence accurately provides the surface with an embossment excellent in design.

The decorative sheet may be constituted only of a mold layer (that is, constituted of a single mold layer). In this case, the decorative sheet is a resin sheet that is constituted only of a mold layer having an embossed surface and containing a polyolefin-based resin as a main component, and that has the 100% modulus at 200° C. of 0.02 MPa or more, which is measured in conformity with JIS K6251 (2004 version).

In addition, the decorative sheet may be a resin sheet that is constituted only of a mold layer containing a polyolefin-based resin as a main component and that has the 100% modulus at 200° C. of 0.02 MPa or more, which is measured in conformity with JIS K6251 (2004 version), the mold layer having an embossed surface containing the polyolefin-based resin crosslinked by energy ray irradiation.

That is, the decorative sheet may be a sheet constituted of a single resin layer (only a mold layer) having a surface on which an embossment is formed, containing a polyolefin-based resin crosslinked by energy ray irradiation as a main component, and having the 100% modulus of 0.02 MPa or more.

In a case where the decorative sheet is not a laminated sheet constituted by laminating a plurality of resin layers but a sheet constituted of a single resin layer (only a mold layer), problems that arise in the case where the laminated sheet is used in injection molding (such as problems based on differences in physical properties between the plurality of laminated resin layers) are avoided.

On the other hand, the decorative sheet is not limited to a sheet constituted only of a mold layer and may further have an additional layer laminated on one surface side of the mold layer. In this case, the surface of the mold layer on which an embossment is formed is the surface of the mold layer on the side of the additional layer, and in a case where the mold layer is in contact with the additional layer, the surface is the surface of the mold layer in contact with the additional layer.

The additional layer is not particularly limited as long as the additional layer is a resin layer formed in addition to the mold layer, and the additional layer may include, for example, one or more kinds of resin layers selected from the group consisting of a protective layer, a pattern layer, and a release layer each having such a function as described later. In addition, the additional layer may further have an adhesion layer having such a function as described later.

In a case where the decorative sheet has the additional layer, the decorative sheet may be, for example, a laminated sheet having a resin layer (mold layer) having an embossed surface, and one or more other resin layers (e.g., one or more kinds selected from the group consisting of a release layer, a protective layer, and a pattern layer) (i.e., the additional layer) laminated on the resin layer as described later. The use of such a laminated sheet transfers, for example, the protective layer or the pattern layer onto a molded resin article through injection molding. In addition, the decorative sheet may further have an adhesion layer on the surface of the laminated sheet in contact with a molded resin article as required.

The decorative sheet may further have, for example, a transfer layer laminated on one surface side of the mold layer, and an embossment corresponding to the embossment of the surface of the mold layer (embossed surface) may be formed on the surface of the transfer layer. It should be noted that in this case as well, the surface of the mold layer on which the embossment is formed is the surface of the mold layer on the side of the additional layer, and in a case where the mold layer is in contact with the additional layer, the surface is the surface of the mold layer in contact with the additional layer. More specifically, for example, the surface of the mold layer on which the embossment is formed is the surface of the mold layer on the side of the transfer layer, and in a case where the mold layer is in contact with the transfer layer, the surface is the surface of the mold layer in contact with the transfer layer.

Here, the transfer layer is a resin layer laminated on the embossed surface side of the mold layer and is a resin layer to be transferred from the mold layer onto a molded resin article by injection molding. The transfer layer is not particularly limited as long as the transfer layer is a resin layer to be transferred from the decorative sheet onto the molded resin article, and the transfer layer is constituted of one resin layer or a plurality of laminated resin layers. The constitution of the transfer layer is arbitrarily determined in accordance with desired characteristics (such as a surface characteristic and a design) which a molded resin article to be finally obtained should have.

The transfer layer may include, for example, a protective layer and/or a pattern layer. In a case where the transfer layer includes a protective layer and a pattern layer that are laminated, the transfer layer preferably has the protective layer laminated on the embossed surface of the mold layer and the pattern layer laminated on the protective layer.

The protective layer is not particularly limited as long as the protective layer is a resin layer for protecting the surface of a molded resin article on which an embossment is formed. In a case where the transfer layer includes the protective layer and any other resin layer, the protective layer preferably constitutes, in a molded resin article, the outermost layer of the transfer layer transferred onto the molded resin article.

In a case where the decorative sheet has the transfer layer including the protective layer, the protective layer may be formed on the surface of a molded resin article simultaneously with injection molding. As a result, preferred characteristics (such as gloss, abrasion resistance, and chemical resistance) are imparted to the molded resin article.

A resin constituting the protective layer is not particularly limited as long as the resin achieves the protective layer that protects the surface of a molded resin article, and any one or more kinds of resin may be used. As the resin constituting the protective layer, there may be used, for example, one or more kinds selected from the group consisting of an acrylic resin, a vinyl-based resin, a urethane-based resin, a polyester-based resin, a polypropylene-based resin, a polyethylene-based resin, a polystyrene-based resin, a polycarbonate-based resin, a vinylon-based resin, an acetate-based resin, a polyamide-based resin, a silicon-based resin, a fluorine-based resin, and a copolymer resin thereof.

The pattern layer is not particularly limited as long as the pattern layer is a resin layer that provides the surface of a molded resin article on which an embossment is formed with an additional design in addition to the emboss. That is, the pattern layer is, for example, a resin layer on which one or more kinds of patterns selected from the group consisting of a wood grain pattern, a marble grain pattern, a texture pattern, a letter, a geometrical pattern, and a solid pattern are formed. In the transfer layer, a plurality of pattern layers may be formed in tandem. In addition, the pattern layer may be provided with a metal film layer as required. In this case, the metal film layer may be formed on the entire surface of the pattern layer, or may be formed in a patterned manner on the surface of the pattern layer.

In a case where the decorative sheet has the transfer layer including the pattern layer, the pattern layer may be formed on the surface of a molded resin article simultaneously with injection molding. As a result, a molded resin article excellent in design is obtained reliably.

A resin constituting the pattern layer is not particularly limited as long as the resin achieves the pattern layer that provides the surface of a molded resin article with a design, and any one or more kinds of resin may be used. As the resin constituting the pattern layer, there may be used, for example, one or more kinds selected from the group consisting of a polyester-based resin, an acrylic resin, a vinyl-based resin, a nitrocotton-based resin, a urethane-based resin, a chlorinated rubber-based resin, a vinyl acetate-based resin, and a copolymer resin thereof. In addition, in a case where the pattern layer contains a metal film layer, a material constituting the metal film layer is not particularly limited, and for example, one or more kinds selected from the group consisting of aluminum, chromium, copper, nickel, indium, tin, and silicon oxide may be used.

The transfer layer may have an adhesion layer. That is, the transfer layer may have, for example, the protective layer and/or the pattern layer, and the adhesion layer. The adhesion layer is a resin layer that promotes adhesion between the transfer layer and a molded resin article. Accordingly, the adhesion layer is formed as the outermost layer of the transfer layer in the decorative sheet. That is, the adhesion layer is formed as a resin layer in contact with a resin constituting the molded resin article in injection molding.

A resin constituting the adhesion layer is not particularly limited as long as the resin achieves the adhesion layer that promotes adhesion between the transfer layer and a molded resin article, and any one or more kinds of resins may be used in accordance with adhesiveness with a resin constituting the molded resin article. As the resin constituting the adhesion layer, there may be used, for example, one or more kinds selected from the group consisting of an acrylic resin, a vinyl-based resin, a urethane-based resin, a polyester-based resin, a polypropylene-based resin, a polyethylene-based resin, a polystyrene-based resin, a polycarbonate-based resin, a vinylon-based resin, an acetate-based resin, a polyamide-based resin, a chlorinated polyolefin-based resin, and a copolymer resin thereof.

Although the thickness of the transfer layer is not particularly limited as long as the thickness falls within such a range as to achieve the transfer layer to be transferred from the mold layer onto a molded resin article, the thickness may be set to, for example, 0.5 µm to 150 µm. In a case where the thickness of the transfer layer is 0.5 µm or more, the transfer layer may be uniformly formed. In a case where the thickness of the transfer layer is 150 µm or less, a desired embossment is obtained reliably without the relaxation of the shape of the embossment by the transfer layer. The thickness of the transfer layer may be set to 1 µm to 100 µm, and may be set to 3 µm to 50 µm.

In a case where the transfer layer includes the protective layer, the thickness of the protective layer is not particularly limited as long as the thickness falls within such a range as to achieve the protective layer that protects the surface of a molded resin article. For example, the thickness is preferably 0.5 µm to 50 µm. In a case where the thickness of the protective layer falls within the range of 0.5 µm to 50 µm, the protective layer sufficiently fulfills a function of protecting the surface of the molded resin article and achieves excellent embossing property.

In a case where the transfer layer includes the pattern layer, the thickness of the pattern layer is not particularly limited as long as the thickness falls within such a range as to achieve the pattern layer that provides the surface of a molded resin article with a design. For example, the thickness is preferably 0.5 µm to 50 µm. In a case where the thickness of the pattern layer is 0.5 µm to 50 µm, the surface of the molded resin article is provided with a sufficient design and an excellent embossing property is achieved.

In addition, in a case where the pattern layer includes the metal film layer, the thickness of the metal film layer is preferably, for example, 150 Å to 1,200 Å. In a case where the thickness of the metal film layer is 150 Å to 1,200 Å, the surface of a molded resin article is provided with a sufficient design and the occurrence of cracking is effectively avoided.

In a case where the transfer layer includes the adhesion layer, the thickness of the adhesion layer is not particularly limited as long as the thickness falls within such a range as to achieve the adhesion layer that promotes adhesion between the transfer layer and a molded resin article. For example, the thickness is preferably 0.5 µm to 50 µm. In a case where the thickness of the adhesion layer is 0.5 µm to 50 µm, sufficiently strong adhesion between the adhesion layer and the molded resin article is reliably achieved.

The ten-point average roughness ($R_{zJIS}$) of the embossment of the decorative sheet having the transfer layer, which is measured in conformity with JIS B0601-2001, may be larger than the thickness of the transfer layer. That is, for example, the ten-point average roughness ($R_{zJIS}$) of the embossment formed on the surface of the transfer layer of the decorative sheet (outermost surface of the decorative sheet) and/or the ten-point average roughness ($R_{zJIS}$) of the embossment formed on the surface of the mold layer (embossed surface of the mold layer on the innermost surface side of the transfer layer) may be larger than the thickness of the transfer layer, and the ten-point average roughness ($R_{zJIS}$) of the embossment of each of both the surface of the transfer layer and the surface of the mold layer may be larger than the thickness of the transfer layer. In a case where the ten-point average roughness ($R_{zJIS}$) of the embossment is larger than the thickness of the transfer layer, the decorative sheet transfers the embossment that is excellent in design and deep onto a molded resin article.

In addition, the decorative sheet may have a transfer layer having a thickness of 0.5 µm to 150 µm, and the ten-point average roughness ($R_{zJIS}$) of its embossment may be larger than the thickness of the transfer layer. In addition, the decorative sheet may have a transfer layer having a thickness of 0.5 µm to 150 µm, and the ten-point average roughness ($R_{zJIS}$) of its embossment may be larger than the thickness of the transfer layer and set to 10 µm to 400 µm.

In such a case, the transfer layer may be formed so that its thickness becomes smaller than the ten-point average roughness ($R_{zJIS}$) of an embossment to be formed on the decorative sheet (e.g., 10 µm to 400 µm). The formation of such a thin transfer layer effectively suppresses the relaxation of the embossment by the transfer layer at the time of the formation of the embossment. Accordingly, a molded resin article is provided with a desired embossment and the transfer layer at the same time without any limitations on the characteristics of the embossment, such as shape and depth.

In addition, the 100% modulus of the decorative sheet having the transfer layer at 200° C. is 0.02 MPa or more, which is measured in conformity with JIS K6251 (2004 version). In case where the 100% modulus is 0.02 MPa or more, the decorative sheet exhibits an extremely good embossment-retaining property even under high temperature and high pressure at the time of injection molding, and exhibits excellent transferability of its embossment and transfer layer.

The decorative sheet may have a release layer in addition to the transfer layer or instead of the transfer layer. It should be noted that in this case as well, the surface of the mold layer on which the embossment is formed is the surface of the mold layer on the side of the additional layer, and in case where the mold layer is in contact with the additional layer, the surface is the surface of the mold layer in contact with the additional layer. More specifically, for example, the surface of the mold layer on which the embossment is formed is the surface of the mold layer on the side of the release layer, and in a case where the mold layer is in contact with the release layer, the surface is the surface of the mold layer in contact with the release layer.

The release layer is a resin layer that regulates the separation of the transfer layer and the mold layer, or the separation of a molded resin article and the mold layer. That is, the release layer is a resin layer that is not transferred onto the side of the molded resin article and remains on the side of the mold layer upon separation of the mold layer and the transfer layer, or separation of the mold layer and the molded resin article, after injection molding. Accordingly, the release layer is formed on the embossed surface side of the mold layer (in a case where the decorative sheet has the transfer layer, between the mold layer and the transfer layer). A deep embossment corresponding to the embossment of the mold layer is formed on the release layer formed on the embossed surface side of the mold layer.

A resin constituting the release layer is not particularly limited as long as the resin achieves the release layer that regulates the separation of the transfer layer and the mold layer, and any one or more kinds of resin may be used. For example, one or more kinds selected from the group consisting of a melamine-based resin, a silicone-based resin, a fluorine-based resin, an alkyd-based resin, a phenol-based resin, and a polyethylene-based wax may each be used as the resin constituting the release layer.

The thickness of the release layer is not particularly limited as long as the thickness falls within such a range as to achieve the release layer that regulates the separation of the transfer layer and the mold layer. For example, the thickness is preferably 0.5 µm to 50 µm. In a case where the thickness of the release layer is 0.5 µm to 50 µm, sufficient releasability is achieved and excellent embossing property is achieved.

As described above, the additional layer may include the transfer layer and/or the release layer. That is, for example, the additional layer may include the transfer layer and be free of the release layer, may include the release layer and be free of the transfer layer, or may include the transfer layer and the release layer. In addition, for example, the additional layer may be constituted only by the transfer layer, may be constituted only by the release layer, or may be constituted by the transfer layer and the release layer.

The decorative sheet having the 100% modulus at 200° C. of 0.02 MPa or more, which is measured in conformity with JIS K6251 (2004 version), is manufactured by, for example, forming an embossment on one surface of a resin sheet (mold layer) containing a polyolefin-based resin as a main component and irradiating the resin sheet on which the embossment is formed with an energy ray to crosslink the polyolefin-based resin so that the 100% modulus becomes 0.02 MPa or more.

In a case where such crosslinking that the 100% modulus becomes 0.02 MPa or more is performed by, for example, energy ray irradiation, the crosslinking is achieved by adjusting conditions (such as an irradiation dose) for the energy ray irradiation. It should be noted that a crosslinking reaction does not need to be performed by the energy ray irradiation and may be performed by any other crosslinking method such as chemical crosslinking as long as the object of the present invention is achieved. That is, the 100% modulus of 0.02 MPa or more may be achieved by, for example, the energy ray crosslinking and/or the chemical crosslinking. In case where the chemical crosslinking is performed, only reaction conditions for the chemical crosslinking have to be adjusted.

Specifically, the decorative sheet is manufactured by, for example, a method including: an embossment-forming step of providing a resin sheet having a mold layer containing a polyolefin-based resin as a main component, followed by the formation of an embossment on the resin sheet so that the embossment is formed on the surface of the mold layer; and a crosslinking step of crosslinking the mold layer on which the embossment is formed (at least the polyolefin-based resin of the surface of the mold layer (embossed surface)) so that the 100% modulus of the resin sheet at 200° C. becomes 0.02 MPa or more, which is measured in conformity with JIS K6251 (2004 version).

In the embossment-forming step, a resin sheet (mold layer) which contains a polyolefin-based resin (more specifically, for example, one or more kinds selected from a group consisting of a polyolefin-based elastomer, an ethylene-based resin, and a polypropylene-based resin) as a main component, and on one surface of which an embossment is to be formed is produced. That is, first, a resin composition containing the polyolefin-based resin as a main component is prepared, and then the resin composition is molded into a sheet shape by a molding method such as calendering or extrusion molding to obtain the resin sheet (mold layer).

The resin sheet having a mold layer provided in the embossment-forming step is a resin sheet constituted only by the mold layer in a case where a decorative sheet constituted only by the mold layer is manufactured, or is a resin sheet having the mold layer and an additional layer (for example, an additional layer including a transfer layer and/or a release layer) in a case where a decorative sheet having the additional layer is manufactured.

That is, for example, in a case where the decorative sheet has a transfer layer, a resin sheet having the mold layer and the transfer layer is produced. In this case, for example, first, the mold layer is formed as described above, and then the transfer layer is formed on a surface on one side of the mold layer (a surface on which the embossment is to be formed) by a method such as gravure printing, offset printing, or screen printing, or a method such as coating, dipping, or a reverse coater. Thus, a resin sheet having the mold layer and the transfer layer laminated on the surface on one side of the mold layer is obtained. It should be noted that in a case where the transfer layer includes a plurality of resin layers (for example, a protective layer and/or a pattern layer), the plurality of resin layers are sequentially laminated by such a method as described above. In addition, in a case where the decorative sheet has a release layer, a resin sheet having the mold layer and the release layer is similarly produced. In addition, in a case where the decorative sheet has the transfer layer and the release layer, a resin sheet having the mold layer, the transfer layer, and the release layer is similarly produced.

It should be noted that the resin sheet before crosslinking preferably includes an uncrosslinked portion (a portion that is crosslinkable but has not formed any crosslink yet) in the mold layer. As described later, in a case where the uncrosslinked portion in the resin sheet causes a crosslinking reaction (forms a new crosslinked structure) after the formation of the emboss, the embossment-retaining property of the decorative sheet effectively improves.

Next, the embossment is formed on one surface of the resin sheet thus produced. A method of forming the embossment on the resin sheet is not particularly limited. For example, an embossing method such as a method involving placing an embossing plate on the resin sheet and pressing the plate, or a method involving pressing an embossing roll (such as an emboss roll) against the resin sheet may be used. The method involving using an embossing roll is preferred because the method enables continuous embossing.

Specifically, for example, a thermoplastic resin sheet is heated to a temperature equal to or more than its softening point and less than its melting point (e.g., 60 to 210° C.), and then an embossing roll is pressed against one surface of the softened thermoplastic resin sheet to form, on the one surface of the thermoplastic resin sheet, an embossment corresponding to the embossment formed on the embossing roll.

It should be noted that in a case where the decorative sheet has a transfer layer, an embossment is formed on the surface of the transfer layer and the surface of the mold layer. That is, an embossment ranging from the outermost surface of the transfer layer to the surface of the mold layer on the side of the transfer layer is formed. More specifically, an embossment is provided on the resin sheet from the side of its transfer layer with an embossing mold such as an embossing plate or an embossing roll to integrally deform a portion ranging from the transfer layer to at least the surface of the mold layer, thereby forming a deep embossment excellent in design.

Here, the surface of the transfer layer on which the embossment is formed is each of the surface of the transfer layer on the side of the mold layer and the surface thereof opposite to the mold layer. In addition, the outermost surface of the transfer layer is the surface of the transfer layer opposite to the mold layer. In a case where the transfer layer is the outermost layer of the decorative sheet, the outermost surface of the transfer layer is also the outermost surface of the decorative sheet. In addition, the surface of the mold layer on which the embossment is formed is the surface of the mold layer on the side of the transfer layer, and in a case where the mold layer is in contact with the transfer layer, the surface is the surface of the mold layer in contact with the transfer layer.

In addition, in the embossment-forming step, an embossment having a ten-point average roughness ($R_{zJIS}$) of 10 μm to 400 μm, which is measured in conformity with JIS B0601-2001, may be formed.

In addition, in the crosslinking step, the resin constituting the resin sheet having an embossed surface thus produced (at least the polyolefin-based resin contained in the embossed surface of the mold layer) is crosslinked so that the 100% modulus of the resin sheet at 200° C. becomes 0.02 MPa or more, which is measured in conformity with JIS K6251 (2004 version).

That is, for example, in the crosslinking step, an energy ray is applied to the surface of the mold layer on which the embossment is formed (embossed surface) from the side of the surface of the mold layer (embossed surface side) and/or an opposite side of the surface of the mold layer (an opposite side of the embossed surface) to crosslink the mold layer (at least the polyolefin-based resin contained of the surface of the mold layer (embossed surface)) so that the 100% modulus of the resin sheet having the mold layer becomes 0.02 MPa or more.

More specifically, for example, at least part of the polyolefin-based resin constituting the mold layer (at least the polyolefin-based resin constituting the embossed surface of the mold layer) may be crosslinked by irradiating the resin sheet constituted only by the mold layer or the resin sheet having the mold layer and the transfer layer with the energy ray. It should be noted that at least part of the resin constituting the transfer layer may be crosslinked by the energy ray irradiation.

The energy ray is applied to at least the embossed surface of the resin sheet. Specifically, although the direction in which the energy ray is applied is not particularly limited as long as at least the polyolefin-based resin constituting the embossed surface of the mold layer is crosslinked, the energy ray is preferably applied to the resin sheet from the embossed surface side of the resin sheet and/or an opposite side of the embossed surface (rear surface side), and is more preferably applied from the embossed surface side. It should be noted that the energy ray is preferably applied from an opposite side of the embossed surface in some cases. That is, the direction in which the energy ray is applied to the resin sheet is appropriately selected.

Conditions under which the energy ray is applied (such as the irradiation dose and irradiation time of the energy ray) are not particularly limited as long as the conditions fall within such ranges as to impart desired characteristics to the resin sheet. In a case where an electron beam is applied as the energy ray, for example, its accelerating voltage may be set to 100 kV or more (e.g., 100 to 300 kV) and its irradiation dose may be set to 30 kGy or more (e.g., 30 to 2,000 kGy).

The crosslinking effectively improves the embossment-retaining property of the resin sheet. That is, for example, the uncrosslinked portion in the resin constituting the resin sheet (in particular, the polyolefin-based resin constituting the mold layer) is allowed to cause a crosslinking reaction by the energy ray irradiation to increase a crosslink density in the resin, and as a result, the embossment-retaining property of the resin sheet is effectively improved. Thus, a resin sheet having a crosslinked embossed surface is obtained as a decorative sheet. The decorative sheet exhibits rubber elasticity even at high temperature at the time of injection molding. Accordingly, for example, even when the embossment deforms once during the injection molding, the embossment is restored and retained during the injection molding. Thus, a decorative sheet that brings together excellent embossing property and excellent embossment-retaining property is manufactured.

Next, a method of manufacturing a molded resin article according to this embodiment (hereinafter, referred to as "method of the present invention") will be described with reference to FIGS. 1 to 10.

FIG. 1 is a sectional view concerning an example of a decorative sheet 10. In the example illustrated in FIG. 1, the decorative sheet 10 is a sheet constituted of a single resin layer (only a mold layer). As illustrated in FIG. 1, the decorative sheet 10 has an embossed surface 11 and a surface opposite to the embossed surface 11 (hereinafter, referred to as "rear surface 12").

Figure 2:
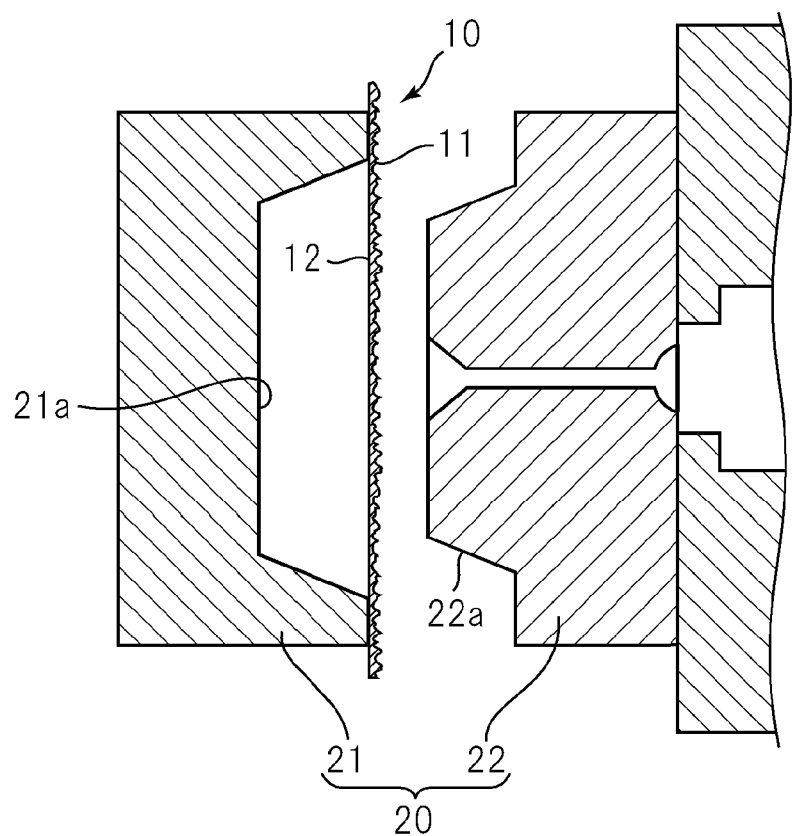
FIG. 2 A sectional view illustrating the manner in which the decorative resin sheet is placed in an injection molding die in a method of manufacturing a molded resin article according to an embodiment of the present invention.
Figure 3:
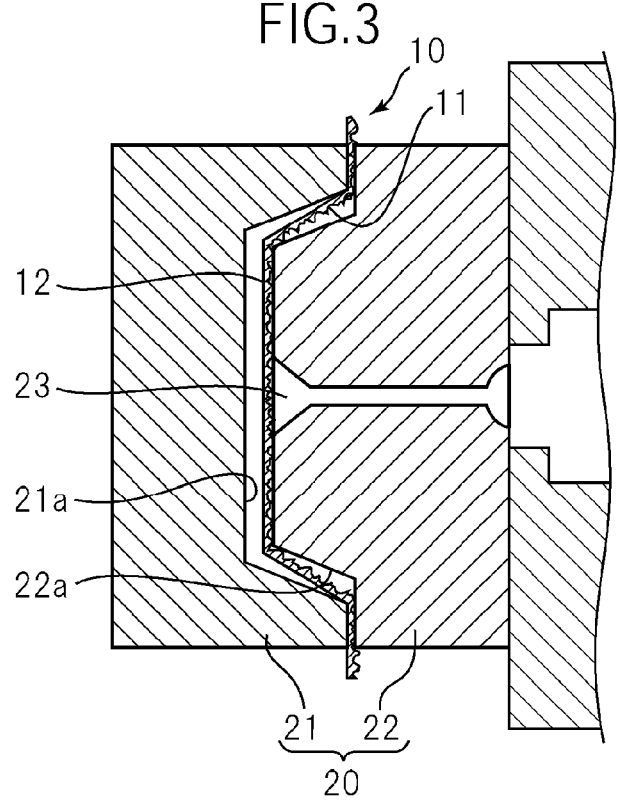
FIG. 3 A sectional view illustrating the injection molding die in the inside of which the decorative resin sheet is placed in the method of manufacturing a molded resin article according to the embodiment of the present invention.
Figure 4:
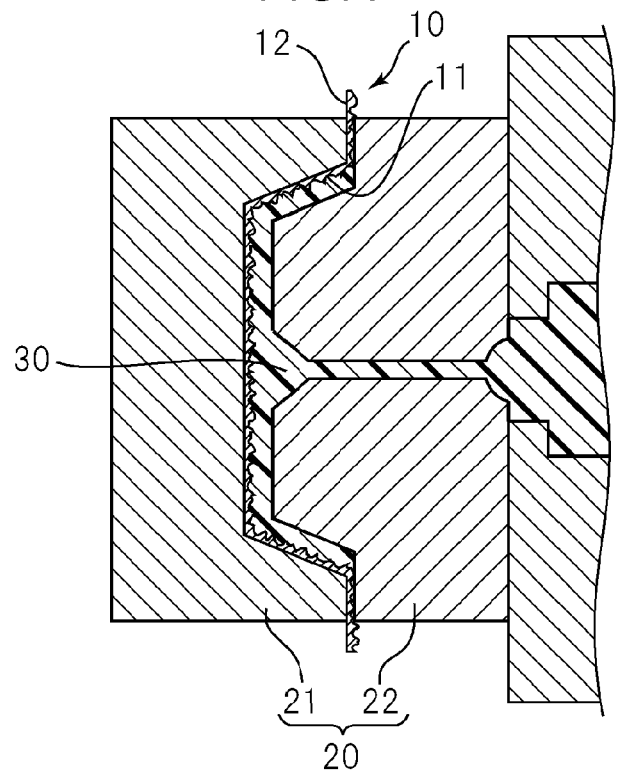
FIG. 4 A sectional view illustrating the manner in which a molten resin is injected into the inside of the injection molding die in which the decorative resin sheet is placed in the method of manufacturing a molded resin article according to the embodiment of the present invention.
Figure 5:
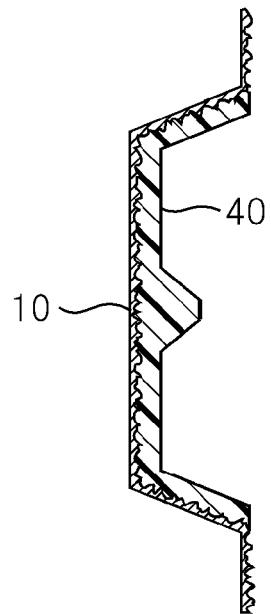
FIG. 5 A sectional view illustrating a molded resin article to which the decorative resin sheet adheres, the molded resin article being taken out of the injection molding die, in the method of manufacturing a molded resin article according to the embodiment of the present invention.
Figure 6:
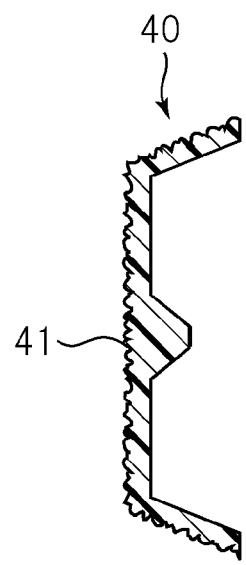
FIG. 6 A sectional view illustrating the molded resin article from which the decorative resin sheet is peeled (separated) in the method of manufacturing a molded resin article according to the embodiment of the present invention.

FIG. 2 to FIG. 6 each illustrate the manner in which injection molding is performed by using the decorative sheet 10 illustrated in FIG. 1 in the method of the present invention. That is, FIG. 2 is a sectional view illustrating the manner in which the decorative sheet 10 is placed in an injection molding die 20. FIG. 3 is a sectional view illustrating the injection molding die 20 inside which the decorative sheet 10 is placed. FIG. 4 is a sectional view illustrating the manner in which a molten resin (hereinafter, referred to as "molding resin 30") is injected into the inside of the injection molding die 20 in which the decorative sheet 10 is placed. FIG. 5 is a sectional view illustrating a molded resin article 40 to which the decorative sheet 10 adheres, the molded resin article being taken out of the injection molding die 20. FIG. 6 is a sectional view illustrating the molded resin article 40 after the peeling (separation) of the decorative sheet 10 therefrom (injection-molded article manufactured by the method of the present invention).

As described above, the decorative sheet 10 illustrated in FIG. 1 is manufactured by a method including: an embossment-forming step of providing a resin sheet formed only of a mold layer containing a polyolefin-based resin as a main component, followed by the formation of an embossment on the resin sheet so that the embossment is formed on the surface of the mold layer (the surface of the resin sheet corresponding to the embossed surface 11 of the decorative sheet 10 illustrated in FIG. 1); and a crosslinking step of crosslinking the mold layer on which the embossment is formed (at least the polyolefin-based resin contained of the surface of the mold layer (the embossed surface 11)) so that the 100% modulus of the resin sheet at 200° C. becomes 0.02 MPa or more, which is measured in conformity with JIS K6251 (2004 version).

In the method of the present invention, the embossment is formed on the surface of the molded resin article 40 with the decorative sheet 10 simultaneously with the injection molding. That is, the method of the present invention includes: a placing step of placing the decorative sheet 10 in the injection molding die 20 so that its embossed surface 11 faces the side of a cavity 23 (see FIG. 3); a molding step of injecting the molten molding resin 30 into the injection molding die 20; and a separating step of separating the formed molded resin article 40 and the decorative sheet 10.

In the placing step, as illustrated in FIG. 2, the decorative sheet 10 is placed in the injection molding die 20 so that its embossed surface 11 faces a side from which the molten molding resin 30 (see FIG. 4) is injected. That is, in the example illustrated in FIG. 2, the decorative sheet 10 is placed in a movable die 21 that is part of the injection molding die 20 and that is a female die so that its rear surface 12 faces the side of an inner surface 21a of the movable die 21. It should be noted that the part of the injection molding die 20 in which the decorative sheet 10 is placed is not limited to the example illustrated in FIG. 2 and may be, for example, a fixed die 22 that is a male die. In addition, the movable die 21 may be a male die and the fixed die 22 may be a female die.

Upon placement of the decorative sheet 10 in the injection molding die 20, for example, the decorative sheet 10 may be preformed into a shape corresponding to the injection molding die 20 (e.g., a shape corresponding to the inner surface 21a of the movable die 21) by a molding method such as vacuum molding or pressure molding in advance, and the preformed decorative sheet 10 may be placed along the injection molding die 20. In the example illustrated in FIG. 2, however, the decorative sheet 10 is not preformed.

That is, in FIG. 2, the decorative sheet 10 is not preformed into a shape corresponding to the inner surface 21a of the movable die 21 and remains in a flat sheet shape. Accordingly, the decorative sheet 10 is fixed to part of the movable die 21 so that a gap is formed between the sheet and the inner surface 21a of the movable die 21. In a case where the preforming of the decorative sheet 10 is not performed as described above, the manufacture of the molded resin article 40 is simply and efficiently performed.

Next, as illustrated in FIG. 3, the injection molding die 20 is closed and placed, and then the cavity 23 as a space into which the molding resin 30 is injected (space surrounded by the embossed surface 11 of the decorative sheet 10 and an inner surface 22a of the fixed die 22) is formed in the injection molding die 20. That is, in the example illustrated in FIG. 3, the movable die 21 to which the decorative sheet 10 is fixed, and the fixed die 22 that is the other part of the injection molding die 20 and that is a male die, are clamped. As a result, the decorative sheet 10 is fixed in the injection molding die 20 with its embossed surface 11 facing toward the cavity 23 (i.e., with the embossed surface 11 facing toward the inner surface 22a of the fixed die 22).

Then, in the molding step, the molten molding resin 30 is injected toward the embossed surface 11 of the decorative sheet 10 in the injection molding die 20 to mold the molded resin article 40. That is, as illustrated in FIG. 4, the molten molding resin 30 is injected into the cavity 23 of the injection molding die 20, and is then cooled and solidified. Conditions for the injection molding may be arbitrarily set in accordance with the kind of the molding resin 30 or the like, and may be set to, for example, the same conditions as those of general injection molding.

The molding resin 30 used in the injection molding and constituting the molded resin article 40 is not particularly limited as long as the resin is used in the injection molding. As the molding resin 30, for example, a general-purpose resin may be used. As the general-purpose resin, one or more kinds selected from the group consisting of a polyethylene (PE)-based resin, a polypropylene (PP)-based resin, a polystyrene (PS)-based resin (including an AS resin, an ABS resin, an AES resin, an ASA resin, and an ACS resin), an acrylic (PMMA) resin, and a polymer alloy thereof may be used.

In addition, the decorative sheet 10 has excellent embossment-retaining property even at high temperature in injection molding, and hence an engineering plastic may be used as the molding resin 30. As the engineering plastic, one or more kinds selected from the group consisting of a polycarbonate (PC)-based resin, a polyamide (PA)-based resin, a polyethylene terephthalate (PET)-based resin, a polybutylene terephthalate (PBT)-based resin, a modified polyphenylene ether (PPE)-based resin, and a polymer alloy thereof (e.g., a PC/ABS-based resin, a PC/PET-based resin, or a PA/ABS-based resin) may be used.

In the injection molding, the decorative sheet 10 is extended by the injected molding resin 30 at high temperature and high pressure, and is then pressed against the inner surface 21a of the movable die 21 as illustrated in FIG. 3 and FIG. 4. That is, the decorative sheet 10 is sandwiched between the movable die 21 and the molding resin 30 under high temperature and high pressure.

After that, in the separating step, the molded resin article 40 formed by the solidification of the molding resin 30 and the decorative sheet 10 are separated. That is, as illustrated in FIG. 5, the molded resin article 40 to at least part of the surface of which the decorative sheet 10 attaches is taken out of the injection molding die 20. Then, the decorative sheet 10 is peeled (separated) from the molded resin article 40 thus taken out. Thus, as illustrated in FIG. 6, the molded resin article 40 having a surface 41 on which an embossment corresponding to the embossment of the decorative sheet 10 is formed (embossed decorative injection-molded article) is obtained.

Figure 7:
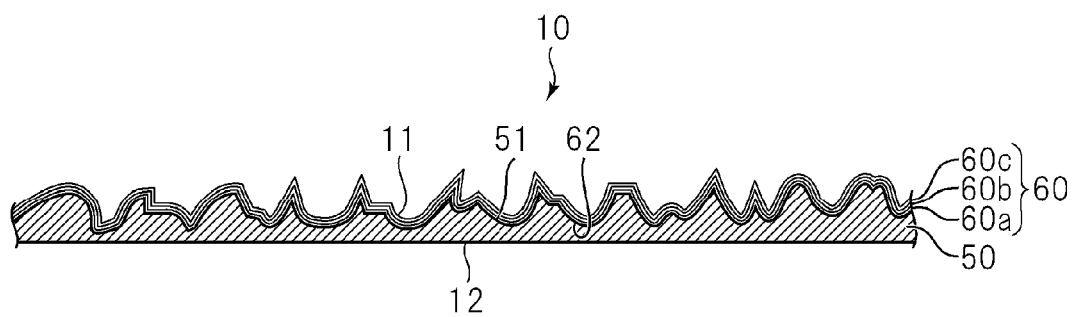
FIG. 7 A sectional view concerning another example of the decorative resin sheet according to the embodiment of the present invention.

FIG. 7 is a sectional view concerning another example of the decorative sheet 10. In the example illustrated in FIG. 7, the decorative sheet 10 has a mold layer 50 containing a polyolefin-based resin as a main component and a transfer layer 60 laminated on the side of one surface (embossed surface) 51 of the mold layer 50. Further, the transfer layer 60 has a protective layer 60a laminated on the embossed surface 51 of the mold layer 50, a pattern layer 60b laminated on the protective layer 60a, and an adhesion layer 60c laminated on the pattern layer 60b.

Figure 8:
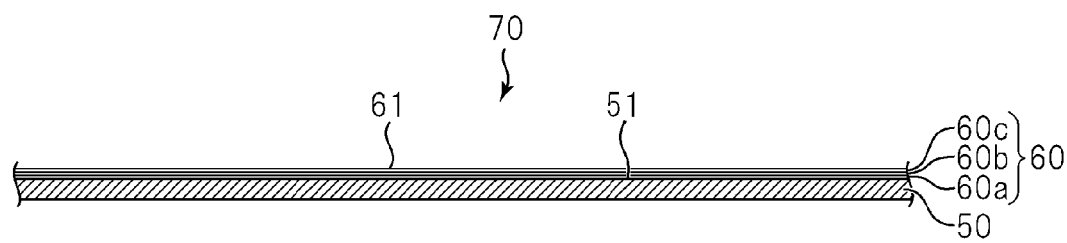
FIG. 8 A sectional view concerning an example of a resin sheet to be used in the manufacture of the decorative resin sheet illustrated in FIG. 7.

FIG. 8 is a sectional view of a resin sheet 70 to be used in the manufacture of the decorative sheet 10 illustrated in FIG. 7. As illustrated in FIG. 8, the resin sheet 70 is a sheet on which an embossment has not yet been formed, and has the mold layer 50 and the transfer layer 60 (including the protective layer 60a, the pattern layer 60b, and the adhesion layer 60c) laminated on the mold layer 50 as with the decorative sheet 10 illustrated in FIG. 7.

Figure 9:
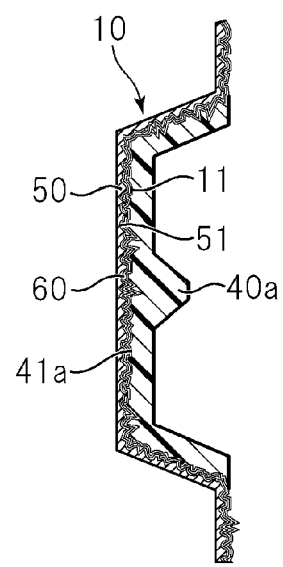
FIG. 9 A sectional view illustrating a molded resin article to which a decorative resin sheet having a transfer layer adheres, the molded resin article being taken out of the injection molding die, in the method of manufacturing a molded resin article according to the embodiment of the present invention.
Figure 10:
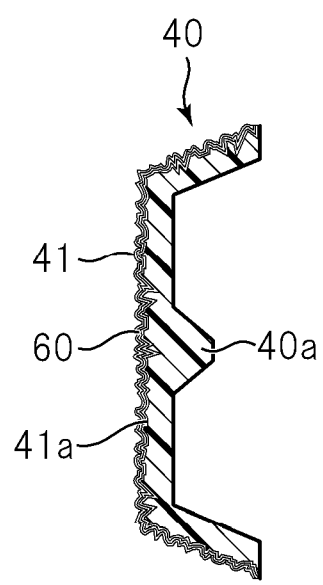
FIG. 10 A sectional view illustrating an example of a molded resin article from which the mold layer of the decorative resin sheet is peeled (separated) and onto which its transfer layer is transferred in the method of manufacturing a molded resin article according to the embodiment of the present invention.

FIG. 9 is a sectional view illustrating the molded resin article 40 to which the decorative sheet 10 illustrated in FIG. 7 adheres, the molded resin article being taken out of the injection molding die 20, in injection molding involving using the decorative sheet 10, and FIG. 10 is a sectional view illustrating the molded resin article 40 after the peeling (separation) of the mold layer of the decorative sheet 10 therefrom (injection-molded article manufactured by the method of the present invention).

The decorative sheet 10 illustrated in FIG. 7 is manufactured by the method including the embossment-forming step and the crosslinking step. That is, first, in the embossment-forming step, the resin sheet 70 illustrated in FIG. 8 is provided, and then an embossment is formed on a surface 61 of the transfer layer 60 of the resin sheet 70 and the surface 51 of the mold layer 50 thereof. That is, an embossment ranging from an outermost surface 61 of the transfer layer 60 to the surface 51 of the mold layer 50 on the side of the transfer layer 60 in the decorative sheet 10 is formed (see FIG. 7).

In addition, in the embossment-forming step, as illustrated in FIG. 7, an embossment having a ten-point average roughness ($R_{zJIS}$), which is measured in conformity with JIS B0601-2001, larger than the thickness of the transfer layer 60 may be formed. In this case, the thickness of the transfer layer 60 may be set to 0.5 μm to 150 μm.

In addition, in the embossment-forming step, an emboss having a ten-point average roughness ($R_{zJIS}$) of 10 μm to 400 μm, which is measured in conformity with JIS B0601-2001, may be formed. That is, in this case, an embossment having a ten-point average roughness ($R_{zJIS}$) of 10 μm to 400 μm is formed on the outermost surface 61 of the transfer layer 60. Further, an embossment having a ten-point average roughness ($R_{zJIS}$) of 10 μm to 400 μm may be formed on the outermost surface 61 of the transfer layer 60 and the surface 51 of the mold layer 50. That is, for example, an embossment is formed on the outermost surface 61 of the transfer layer 60 so that the ten-point average roughness ($R_{zJIS}$) of an embossment to be formed on the surface 51 of the mold layer 50 from the side of the transfer layer 60 of the resin sheet 70 becomes 10 μm to 400 μm. In this case, the ten-point average roughness ($R_{zJIS}$) of the embossment to be formed on the outermost surface 61 of the transfer layer 60 also necessarily becomes 10 µm to 400 µm.

Next, in the crosslinking step, the mold layer 50 on which the embossment is formed (at least the polyolefin-based resin of the surface 51 of the mold layer 50) is crosslinked so that the 100% modulus of the decorative sheet 10 at 200° C. becomes 0.02 MPa or more, which is measured in conformity with JIS K6251 (2004 version). Specifically, for example, the surface 51 of the mold layer 50 on which the embossment is formed is irradiated with an energy ray from the side of the surface 51 (side of the embossed surface 11 of the decorative sheet 10) and/or an opposite side of the surface 51 (side of the rear surface 12 of the decorative sheet 10). The energy ray irradiation crosslinks at least the polyolefin-based resin constituting the surface 51 of the mold layer 50. At this time, at least part of the resin constituting the transfer layer 60 may be crosslinked by the energy ray irradiation. In addition, in a case where the mold layer 50 contains any other resin in addition to the polyolefin-based resin, at least part of the other resin may further be crosslinked.

Thus, as illustrated in FIG. 7, the decorative sheet 10 on which an integral embossment ranging from its transfer layer 60 to its mold layer 50 is formed and which has the 100% modulus of 0.02 MPa or more is obtained. As described above, the decorative sheet 10 is manufactured by first laminating the transfer layer 60 on the mold layer 50 on which an embossment is not formed, then integrally forming an embossment on the mold layer 50 and the transfer layer 60, and finally crosslinking the polyolefin-based resin of the surface 51 on which the embossment is formed (crosslinking by, for example, energy ray irradiation). Accordingly, the transfer layer 60 on which a deep embossment corresponding to the embossment formed on the mold layer 50 is formed and which has a uniform thickness is achieved.

Then, in the method of the present invention involving using such a decorative sheet 10, as in the example illustrated in each of FIG. 2 and FIG. 3, in the placing step, the decorative sheet 10 is placed in the injection molding die 20 so that its embossed surface 11 faces the side from which the molten molding resin 30 is injected (side of the cavity 23 illustrated in FIG. 3).

Next, in the molding step, as in the example illustrated in FIG. 4, the molten molding resin 30 is injected toward the surface 51 of the mold layer 50 on which the embossment is formed (side of the embossed surface 11 of the decorative sheet 10) in the injection molding die 20 to mold the molded resin article 40.

Then, in the separating step, as illustrated in FIG. 9 and FIG. 10, the transfer layer 60 adhering to the molded resin article 40 and the mold layer 50 are separated. That is, first, as illustrated in FIG. 9, a resin main body 40a constituted by the solidified molding resin 30 (see FIG. 4) to at least part of a surface 41a of which the decorative sheet 10 adheres is taken out of the injection molding die 20. Then, as illustrated in FIG. 10, the mold layer 50 is peeled (separated) from the transfer layer 60 adhering to the resin main body 40a.

As a result, as illustrated in FIG. 10, the molded resin article 40 having the surface 41 on which the embossment corresponding to the embossment of the surface 51 of the mold layer 50 is formed (embossed decorative injection-molded article) is obtained. That is, the molded resin article 40 has the surface 41 onto which the emboss of the mold layer 50 of the decorative sheet 10 is transferred. The surface 41 of the molded resin article 40 is an innermost surface 62 (see FIG. 7) of the transfer layer 60 in contact with the embossed surface 51 of the mold layer 50. It should be noted that the embossment corresponding to the embossed surface 11 of the decorative sheet 10 is formed on the surface 41a of the resin main body 40a of the molded resin article 40 on the side of the transfer layer 60 as well.

It should be noted that the method of the present invention may be free of the embossment-forming step and the crosslinking step, or may include the embossment-forming step and the crosslinking step. That is, in this case, the method includes the embossment-forming step, the crosslinking step, the placing step, the molding step, and the separating step.

The embossment formed on the molded resin article 40 has three-dimensional concavity and convexity each having a large depth in correspondence with the embossment of the decorative sheet 10 and is excellent in design. That is, the molded resin article 40 has the surface 41 on which an embossment having the ten-point average roughness ($R_{zJIS}$) of, for example, 10 µm to 400 µm is formed.

As described above, according to this embodiment, in injection molding involving using any one of the wide variety of molding resins 30 ranging from a general-purpose resin to an engineering plastic, the surface 41 of the molded resin article 40 is accurately provided with an embossment excellent in design such as an embossment having deep three-dimensional concavity and convexity while the characteristics of the molding resin 30 are taken advantage of.

In addition, the molded resin article 40 may have a deep embossment excellent in design even in a portion that is not provided with an embossment (especially a deep embossment) by using a die alone, e.g., the so-called undercut surface. That is, for example, at least part of the surface 41 of the molded resin article 40 may be an undercut surface on which an embossment having a ten-point average roughness ($R_{zJIS}$) of 10 µm to 400 µm, which is measured in conformity with JIS B0601-2001, is formed. The undercut surface may be constituted of the transfer layer 60. In addition, for example, at least part of the surface 41 of the molded resin article 40 may be an undercut surface constituted of the transfer layer 60, and an embossment having a ten-point average roughness ($R_{zJIS}$), which is measured in conformity with JIS B0601-2001, larger than the thickness of the transfer layer 60 may be formed on the undercut surface. In addition, the embossment of the undercut surface may have a ten-point average roughness ($R_{zJIS}$) of 10 µm to 400 µm, which is measured in conformity with JIS B0601-2001.

In addition, one of the features of the present invention lies in that the decorative sheet 10, which is obtained by first laminating the transfer layer 60 on the mold layer 50 and then providing an embossment ranging from the side of the surface 61 of the transfer layer 60 to the surface 51 of the mold layer 50, followed by the crosslinking of the polyolefin-based resin of the surface 51 provided with the embossment, is used.

That is, hitherto, for example, an approach involving first forming an embossment on the surface of a base material sheet and then forming a transfer layer on the surface has been conceived. In this case, however, it has been difficult to form an embossment having a depth larger than the thickness of the transfer layer.

In addition, hitherto, for example, an approach involving laminating a transfer layer on a base material sheet and providing an embossment from the side of the base material sheet (side opposite to the transfer layer) has been conceived. In this case, however, it has been difficult to form a sufficiently deep embossment because the embossment is formed through the base material sheet.

In addition, hitherto, for example, an approach involving laminating any other sheet on the embossed surface of a resin sheet and providing a molded resin article with an embossment through the other sheet has been conceived. In this case, however, it has been difficult to form a deep embossment excellent in design on the surface of the molded resin article because the emboss is relaxed by the other sheet.

In contrast, in the decorative sheet 10 according to the present invention, as described above, the transfer layer 60 is laminated on the mold layer 50 before embossment formation. Accordingly, the transfer layer is formed so as to have an arbitrary and uniform thickness. In addition, an embossment is formed at one time on the mold layer 50 and the transfer layer that are integral, and hence an embossment having a depth larger than the thickness of the transfer layer and excellent in design is achieved.

Next, a specific example according to this embodiment is described.

EXAMPLES

Manufacture of Decorative Sheets According to Examples 1 to 13 and Comparative Examples 1 to 10

One or more kinds of four kinds of TPO's were each used as a polyolefin-based thermoplastic elastomer. That is, one or more kinds selected from the group consisting of an uncrosslinked TPO (Q-100F manufactured by SunAllomer Ltd.) (hereinafter, referred to as "TPO-I"), a TPO that was partially crosslinked and included an uncrosslinked portion (Milastomer 6030NH manufactured by Mitsui Chemicals, Inc.) (hereinafter, referred to as "TPO-II"), a TPO that was partially crosslinked and included an uncrosslinked portion (Milastomer 8030NH manufactured by Mitsui Chemicals, Inc.) (hereinafter, referred to as "TPO-III"), and a TPO that was partially crosslinked and included an uncrosslinked portion (WT485 manufactured by Sumitomo Chemical Co., Ltd.) (hereinafter, referred to as "TPO-IV"), were each used.

In addition, as the polyethylene-based resin, linear low density polyethylene (Sumikathene FW201-0 manufactured by SUMITOMO CHEMICAL Co., Ltd.) (hereinafter, referred to as "LLDPE-I") or linear low density polyethylene (Evolue SP0540 manufactured by Prime Polymer Co., Ltd.) (hereinafter, referred to as "LLDPE-II") was used. In addition, as another thermoplastic resin, random polypropylene (random PP) (B-241 manufactured by Prime Polymer Co., Ltd.) was used as required. In addition, as the crosslinking aid, trimethylolpropane trimethacrylate (TMPTMA) (Acryester TMP manufactured by Mitsubishi Rayon Co., Ltd.) was used as required.

FIG. 11 and FIG. 12 each show the composition (blending ratio (part(s) by weight)) of raw materials used in the manufacture of a decorative sheet. That is, in Examples 1 to 13 and Comparative Examples 1 to 10, resin compositions were prepared according to seven kinds of formulation "formulation 1" to "formulation 7" as shown in FIG. 11 and FIG. 12.

Next, the resin compositions prepared as described above were each molded into a sheet shape with a laboratory roll. Further, an embossing plate was placed on one surface of the resin sheet, and then the embossing plate was pressed against the resin sheet with a press machine whose temperature had been adjusted to 170° C. After that, the embossing plate was peeled from the resin sheet. Thus, a resin sheet having an embossed surface was obtained.

Then, in each of Examples 1 to 13, and Comparative Examples 2, 4, and 5, a resin constituting the resin sheet having an embossed surface was crosslinked by irradiating the resin sheet with an electron beam. That is, the resin sheet was irradiated with the electron beam from the side of its embossed surface using an electron beam irradiation apparatus (CB250/30/20 mA manufactured by IWASAKI ELECTRIC CO., LTD.) at an accelerating voltage of 200 kV, and at an irradiation dose (kGy) shown in each of FIG. 11 and FIG. 12. On the other hand, in each of Comparative Examples 1, 3, and 6 to 10, no electron beam irradiation was performed.

Thus, such a decorative sheet (decorative sheet constituted only by a mold layer) having an average thickness of 260 μm to 300 μm as shown in each of FIG. 11 and FIG. 12 was obtained. Then, the ten-point average roughness ($R_{zJIS}$) of the embossment of the decorative sheet was measured with a surface roughness meter (SE-3A manufactured by Kosaka Laboratory Ltd.). It should be noted that the ten-point average roughness ($R_{zJIS}$) is described in the appendix of JIS B0601-2001 and is more specifically, for example, a ten-point average roughness ($R_{zJIS94}$) based on digital data.

In addition, the tension test of the decorative sheet was performed by a method in conformity with JIS K6251 (2004 version) (the corresponding international standard was ISO 37 (1994 version)) to measure the 100% modulus of the decorative sheet at 200° C. Here, the shape of a test piece was a dumbbell No. 3 shape and the thickness of the test piece was set to the average thickness (described later) of the decorative sheet. A distance between a pair of chucks for holding both ends of the test piece at the time of the initiation of the test was set to 60 mm and a tension speed was set to 200 mm/min. In addition, the test was performed in a chamber at 200° C. and hence a gauge length specified by JIS could not be confirmed. Accordingly, the time point at which the distance between the pair of chucks reached 120 mm was defined as the time point at which the tensile elongation of the test piece became 100%.

It should be noted that the average thickness of the decorative sheet was determined as described below. First, a test piece measuring 3 cm long by 3 cm wide was cut out of the decorative sheet and then the weight (g) of the test piece was measured with an electronic balance. Next, the specific gravity (g/cm$^3$) of the test piece was determined by an underwater substitution method (method A) in conformity with JIS K7112-1999. Then, the average thickness of the decorative sheet was measured by using the following equation on the assumption that the embossed surface of the decorative sheet was a flat surface: average thickness (μm)= weight (g) of test piece/(specific gravity (g/cm$^3$)×3 cm×3 cm))×10$^4$. In addition, the 100% modulus was calculated on the basis of the average thickness of the decorative sheet thus determined.

Manufacture of Decorative Sheets According to Comparative Examples 11 to 13

An embossing plate was placed on one surface of a sheet made of an acrylic resin having a thickness of 250 μm (Sunduren SD014 manufactured by KANEKA CORPORATION), and then the embossing plate was pressed against the sheet with a press whose temperature had been adjusted to 170° C. Thus, a sheet made of an acrylic resin having an embossed surface was obtained.

Further, in each of Comparative Examples 12 and 13, the sheet made of an acrylic resin was irradiated with an electron beam from the side of its embossed surface with an electron beam irradiation apparatus (CB250/30/20 mA manufactured by IWASAKI ELECTRIC CO., LTD.) at an accelerating voltage of 200 kV and an irradiation dose shown in FIG. 12.

Thus, a decorative sheet formed of the sheet made of an acrylic resin having an average thickness of 250 µm was obtained. Then, the ten-point average roughness ($R_{zJIS}$) and 100% modulus of the decorative sheet were measured in the same manner as in the foregoing examples.

Manufacture of Decorative Sheet According to Comparative Example 14

A resin composition prepared by kneading resins according to the "formulation 1" was molded into a sheet shape with a laboratory roll to obtain a resin sheet. Next, a UV crosslinkable resin (Rayqueen RQ5005 manufactured by Mitsubishi Rayon Co., Ltd.) was applied to one surface of the resin sheet with a bar coater so that its thickness after crosslinking became about 20 µm, followed by drying in an oven at 80° C. for about 3 minutes. The coating layer of the UV crosslinkable resin thus laminated on the surface of the resin sheet was not crosslinked by the drying alone, but was a solid at normal temperature and had thermoplasticity.

Then, an embossing plate was placed on the surface of the coating layer and then an embossment was formed on the coating layer with a press whose temperature had been adjusted to 170° C. Further, the laminated sheet was irradiated with UV light at a dose of about 700 mJ/cm² from the side of its coating layer using a high-pressure mercury lamp, whereby the resin constituting the coating layer was crosslinked.

Thus, a decorative sheet that was made of two layers, i.e., the resin sheet and the coating layer formed of the UV crosslinkable resin having an embossed surface, the layer being laminated on the surface on one side of the resin sheet, and had an average thickness of 300 µm as shown in FIG. 12 was obtained. Then, the ten-point average roughness ($R_{zJIS}$) and 100% modulus of the decorative sheet were measured in the same manner as in the foregoing examples.

Manufacture of Decorative Sheets According to Examples 14 to 19 and Comparative Example 15

A resin composition was prepared by kneading resins according to the "formulation 4" and then a resin sheet was obtained from the resin composition with a calender roll. Next, the resin sheet was passed through an emboss roll whose temperature had been adjusted to 190° C. Thus, a resin sheet on one surface of which an embossment was formed was obtained.

Further, in each of Examples 14 to 19, the resin sheet was irradiated with an electron beam from the side of its embossed surface with an electron beam irradiation apparatus (CB250/30/20 mA manufactured by IWASAKI ELECTRIC CO., LTD.) at an accelerating voltage of 200 kV and an irradiation dose shown in FIG. 13. On the other hand, in Comparative Example 15, electron beam irradiation was not performed.

Thus, a decorative sheet having an average thickness of 220 µm to 240 µm was obtained. Then, the ten-point average roughness ($R_{zJIS}$) and 100% modulus of the decorative sheet were measured in the same manner as in the foregoing examples.

Manufacture of Flat Plate-Like Molded Resin Article

A flat plate-like molded resin article was injection-molded by using each of the decorative sheets manufactured in Examples 1 to 19 and Comparative Examples 1 to 15 as described above. That is, first, the decorative sheet was placed in the fixed die of a flat plate-like injection molding die (120 mm×120 mm, thickness=3 mm, side gate) placed in an injection molding machine (PLASTAR Si-100IV manufactured by TOYO MACHINERY & METAL CO., LTD.) (clamping force=100 t) so that its embossed surface faced a cavity side. Next, the movable die was closed to form a cavity space.

Then, a molten molding resin was injected and filled into the cavity space of the injection molding die. As the molding resin, as shown in FIG. 14, there was used high density polyethylene (HI-ZEX 1300J, manufactured by Prime Polymer Co., Ltd.) ("HDPE" shown in FIG. 14), a PP resin (J108M manufactured by Prime Polymer Co., Ltd.), an ABS resin (Stylac 101 manufactured by Asahi Kasei Corporation), a PC/ABS mixed resin (Multilon TN-7500F manufactured by Teijin Chemicals Ltd.), a PC/PET resin (HYPERLITE JP JP50000 manufactured by Kaneka Corporation) ("PC/PET-I" shown in FIG. 14), or a PC/PET resin (HYPERLITE JP JP1010 manufactured by Kaneka Corporation) ("PC/PET-II" shown in FIG. 14).

That is, in each of Examples 1 to 13 shown in FIG. 11 and Comparative Examples 1 to 14 shown in FIG. 12, a PC/ABS mixed resin was used as a molding resin. In addition, in Examples 14 to 19 and Comparative Example 15, the six kinds of molding resin were used as shown in FIG. 13. FIG. 14 shows injection molding conditions.

Then, the molded resin article was cooled and solidified. After that, the movable die was opened and the molded resin article was taken out of the injection molding die. After that, the decorative sheet was peeled (separated) from the molded resin article.

Manufacture of Decorative Sheets According to Examples 20 to 23 and Comparative Example 16: Manufacture of Molded Resin Article of Notebook Computer Casing Shape A resin composition was prepared by kneading resins according to the "formulation 4" and then a resin sheet was obtained from the resin composition with a calender roll. Next, the resin sheet was passed through an emboss roll whose temperature had been adjusted to 190° C. Thus, a resin sheet having an embossment formed on one surface was formed was obtained.

Further, in each of Examples 20 to 23, the resin sheet was irradiated with an electron beam from the side of its embossed surface with an electron beam irradiation apparatus (CB250/30/20 mA manufactured by IWASAKI ELECTRIC CO., LTD.) at an accelerating voltage of 200 kV and an irradiation dose shown in FIG. 15. On the other hand, in Comparative Example 16, electron beam irradiation was not performed.

Thus, a decorative sheet having an average thickness of 220 µm to 240 µm was obtained. Then, the ten-point average roughness ($R_{zJIS}$) and 100% modulus of the decorative sheet were measured in the same manner as in the forgoing examples.

Then, a molded resin article of a notebook computer casing shape was injection-molded by using the decorative sheet. That is, first, the decorative sheet was placed in the movable die of a die of a notebook computer casing shape (measuring 265 mm wide by 363 mm long by 8 mm tall, thickness=2 mm, film gate) placed in an injection molding machine (850-MG-160 manufactured by Mitsubishi Heavy Industries, Ltd.) (clamping force=850 t) so that its embossed surface faced a cavity side. Next, the fixed die was closed to form a cavity space. It should be noted that the decorative sheet was placed in the injection molding die while remaining in a flat sheet shape without being preformed as in the examples of FIG. 2 and FIG. 3.

Then, a molten PC/ABS mixed resin (Multilon TN-7500F manufactured by Teijin Chemicals Ltd.) was injected and filled into the cavity space of the injection molding die. Injection molding conditions were as follows: a cylinder temperature of 250° C., a nozzle temperature of 260° C., an injection pressure of 95%, an injection speed of 80 mm/sec, an injection time of 10 seconds, a die temperature of 60° C., and a cooling time of 30 seconds.

The molded resin article was cooled and solidified. After that, the movable die was opened and then the molded resin article was taken out of the injection molding die. After that, the decorative sheet was peeled (separated) from the molded resin article.

Evaluations of Examples 1 to 23 and Comparative Examples 1 to 16

The state of the surface of each of the molded resin articles manufactured in Examples 1 to 23 and Comparative Examples 1 to 16 was visually observed, and then the releasability and embossment transferability of the decorative sheet were evaluated. Here, the "releasability" of the decorative sheet was evaluated as an indicator representing the ease with which the decorative sheet was peeled (separated) from the molded resin article after the injection molding.

In addition, the "embossment transferability" was evaluated as an indicator representing the accuracy with which an embossment was transferred from the embossed surface of the decorative sheet onto the surface of the molded resin article.

Results of Evaluations of Examples 1 to 23 and Comparative Examples 1 to 16

FIG. 11, FIG. 12, FIG. 13, and FIG. 15 each show the formulation (part(s) by weight) of resins and electron beam irradiation conditions (an accelerating voltage (kV) and an irradiation dose (kGy)) in the manufacture of a decorative sheet, the average thickness (μm), ten-point average roughness ($R_{zJIS}$) (μm), and 100% modulus (MPa) of the resultant decorative sheet, and the results of the evaluations of the "releasability" and "embossment transferability" in the injection molding.

It should be noted that the term "NA" shown in the column "100% modulus" according to each of the comparative examples of FIG. 12, FIG. 13, and FIG. 15 means that the decorative sheet broke before 100% elongation in its tension test and hence its 100% modulus could not be measured. In addition, the mark "○" in the column "releasability" of each FIG. means that the releasability was good (the decorative sheet was neatly peeled (separated) from the molded resin article), the mark "x" therein means that the releasability was bad (the decorative sheet was hard to peel (separate) because part thereof strongly adhered to the molded resin article), and the mark "xx" therein means that the release could not be performed (the decorative sheet could not be peeled (separated) from the molded resin article). In addition, the mark "○" in the column "embossment transferability" of each figure means that the transferability was good (the embossment of the decorative sheet was accurately transferred onto the molded resin article) and the mark "x" therein means that the transferability was bad (the embossment of the decorative sheet was not accurately transferred onto the molded resin article, and for example, disappearance of the embossment, or the roughening or uneven gloss of the surface on which the embossment was formed occurred). In addition, the mark "-" shown in the column "embossment transferability" according to each of the comparative examples of FIG. 12 and FIG. 13 means that the transferability could not be evaluated because the decorative sheet could not be peeled (separated) from the molded resin article.

Figure 16A:
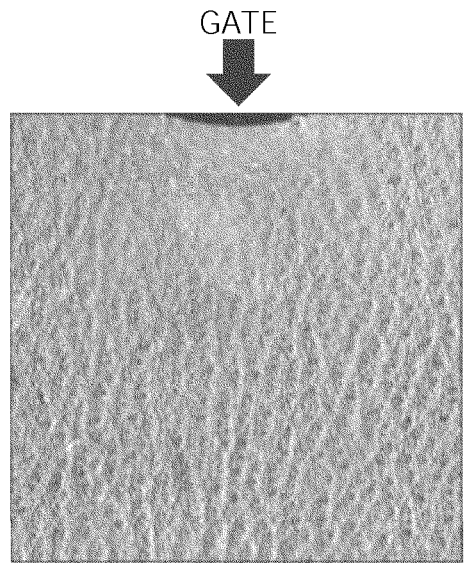
FIG. 16A An explanatory diagram showing an example of the results of observation of the surface of a molded resin article manufactured in Example 3 according to the embodiment of the present invention.
Figure 16B:
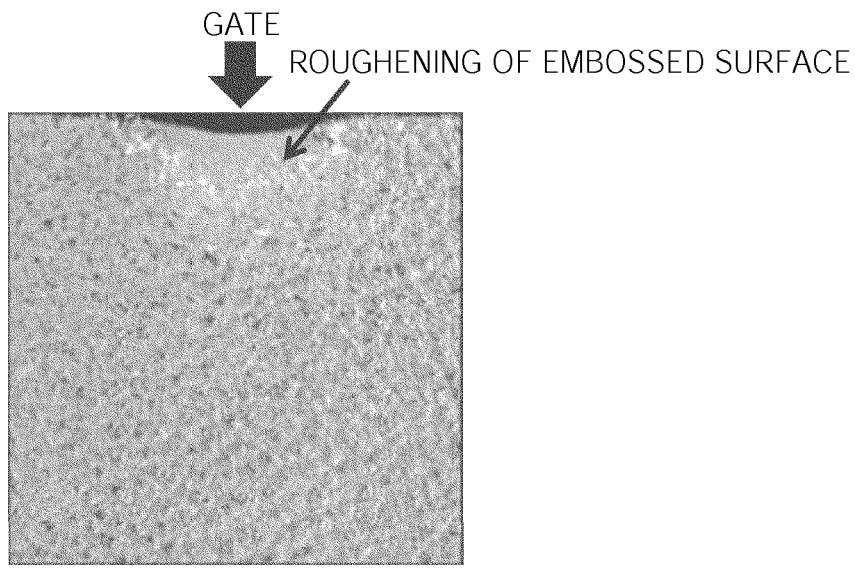
FIG. 16B An explanatory diagram showing an example of the results of observation of the surface of a molded resin article manufactured in Comparative Example 2 according to the embodiment of the present invention.
Figure 16C:
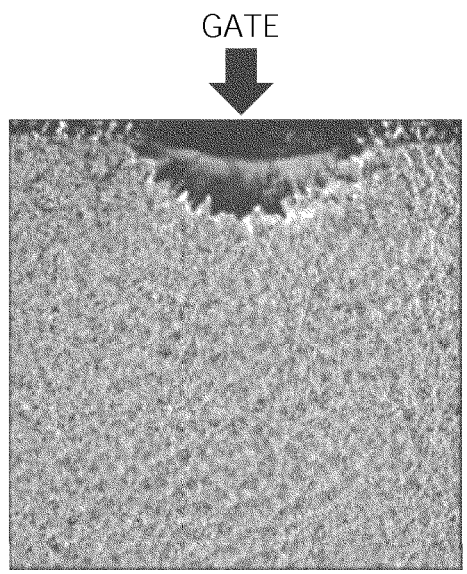
FIG. 16C An explanatory diagram showing an example of the results of observation of the surface of a molded resin article manufactured in Comparative Example 7 according to the embodiment of the present invention.

FIG. 16A to FIG. 16C each show the result of the observation of embossment transferability on the surface of a flat plate-like molded resin article. FIG. 16A shows a photograph obtained by photographing the surface of the molded resin article manufactured in Example 3, FIG. 16B shows a photograph obtained by photographing the surface of the molded resin article manufactured in Comparative Example 2, and FIG. 16C shows a photograph obtained by photographing the surface of the molded resin article manufactured in Comparative Example 7. It should be noted that a "gate" indicated by an arrow in each of FIG. 16A to FIG. 16C represents a position corresponding to the gate of the injection molding die into which the molten resin was injected in the injection molding. That is, in the injection molding, the molten resin was injected in a fan manner from the position of the gate shown in each of FIG. 16A to FIG. 16C and then filled into the die.

As shown in FIG. 11, in the injection molding in each of Examples 1 to 13, the releasability and the emboss transferability were good, and hence a molded resin article onto which an embossment excellent in design was accurately transferred was obtained. In contrast, as shown in FIG. 12, in the injection molding in each of Comparative Examples 1 to 10 and Comparative Example 14, the embossment transferability was bad and hence only a molded resin article onto which an embossment was not accurately transferred was obtained. In the injection molding in each of Comparative Examples 11 to 13, it was impossible even to peel (separate) the decorative sheet from the molded resin article.

In addition, as shown in FIG. 13, in the injection molding in each of Examples 14 to 19, even in the case of using any of the six kinds of molding resin, the releasability and the emboss transferability were good, and hence a molded resin article onto which an embossment excellent in design was accurately transferred was obtained. In contrast, in the injection molding in Comparative Example 15, even in the case of using any of the six kinds of molding resin, the embossment transferability was bad and hence only a molded resin article onto which an embossment was not accurately transferred was obtained.

In addition, as shown in FIG. 16A, on the surface of the molded resin article manufactured in Example 3, a deep embossment was clearly transferred except for the extreme vicinity of the gate and hence the embossment transferability was good. In contrast, as shown in FIG. 16B, on the surface of the molded resin article manufactured in Comparative Example 2, the embossment was transferred onto a portion distant from the gate, but the embossed surface was rough and hence the transferability was bad. In addition, as shown in FIG. 16C, on the surface of the molded resin article manufactured in Comparative Example 7, the embossment was not transferred even onto a portion distant from the gate and hence the transferability was bad. It should be noted that the embossment transferability was evaluated in the molded resin article of a notebook computer casing shape as well, by the same criteria.

In addition, as shown in FIG. 15, with regard to the injection molding of a notebook computer casing as well, in the injection molding in each of Examples 20 to 23, the releasability and the embossment transferability were good, and hence a molded resin article onto which an embossment excellent in design was accurately transferred was obtained. In contrast, in the injection molding in Comparative Example 16, the embossment transferability was bad and hence only a molded resin article onto which an embossment was not accurately transferred was obtained.

As described above, in the injection molding according to each of Examples 1 to 23, the embossment of the decorative sheet was accurately transferred onto the molded resin article, and as a result, a molded resin article on which an embossment that had three-dimensional deep concavity and convexity and that was excellent in design was formed was obtained.

In addition, the 100% modulus of each of the decorative sheets according to Examples 1 to 23 at 200° C. was 0.02 MPa or more, which was measured in conformity with JIS K6251 (2004 version). In contrast, the 100% modulus of each of the decorative sheets according to Comparative Examples 1 to 16 was less than 0.02 MPa.

Therefore, the following was conceived. The decorative sheet showed excellent embossment-retaining property even at high temperature and high pressure at the time of injection molding, particularly in a case where its 100% modulus was 0.02 MPa or more, and as a result, efficient manufacture of a molded resin article on which an embossment excellent in design was formed was achieved.

Manufacture of Decorative Sheets According to Examples 24 to 37 and Comparative Examples 17 to 19

FIG. 17 shows the composition of raw materials used in the manufacture of a decorative sheet (blending ratio (part (s) by weight) of each component). That is, in Examples 24 to 37 and Comparative Examples 17 to 19, resin compositions were prepared according to five kinds of formulation "formulation 5," "formulation 6," "formulation 8," "formulation 9," and "formulation 10" as shown in FIG. 17, and then the resin compositions were each molded into a sheet shape with a laboratory roll to provide a resin sheet (mold layer). It should be noted that a homopolypropylene (E111G manufactured by Prime Polymer Co., Ltd.) was used as a "homo PP" shown in FIG. 17. In addition, in Example 37, a silane crosslinkable LLDPE (LINKLON XLE815N, Mitsubishi Chemical Corporation) was used as an "LLDPE-III" shown in FIG. 17 and a crosslinking catalyst that was a tin-based catalyst (Mark BT-1, ADEKA CORPORATION) was used as a crosslinking aid.

Next, in each of Examples 24 to 33, 36, and 37, and Comparative Example 17, the mold layer was coated with the protective layer, the pattern layer, and the adhesion layer in the stated order with a gravure printing machine, whereby the resin sheet on which the transfer layer constituted of the three layers was formed was obtained. On the other hand, in each of Example 34 and Comparative Example 18, the top of the mold layer was similarly coated with the protective layer and the adhesion layer in the stated order, to thereby obtain the resin sheet on which the transfer layer constituted by the two layers was formed. In addition, in each of Example 35 and Comparative Example 19, the top of the mold layer was similarly coated with the pattern layer and the adhesion layer in the stated order, to thereby obtain the resin sheet on which the transfer layer constituted by the two layers was formed. FIG. 17 shows the thickness (total A) of the transfer layer and the thickness of each layer constituting the transfer layer. It should be noted that the thickness of the transfer layer was determined by observing a section of the resin sheet with a digital microscope (VHX-500F manufactured by KEYENCE CORPORATION) at a magnification of the microscope of 100 to 1,000.

A urethane-based resin coating agent (LEATHEROID LU355SP manufactured by Dainichiseika Color & Chemicals Mfg. Co., Ltd.) was used as a material constituting the protective layer. A urethane resin/vinyl chloride-vinyl acetate resin (copolymer of vinyl chloride and vinyl acetate)-based gravure ink (V451HP sumi ink manufactured by TOYO INK CO., LTD.) was used as a material constituting the pattern layer. A vinyl chloride-vinyl acetate/acrylic resin adhesive varnish (VCHP694 adhesive varnish manufactured by TOYO INK CO., LTD.) was used as a material constituting the adhesion layer.

Further, an embossing plate was placed on the surface of the transfer layer of the resin sheet (the surface of the transfer layer at a side opposite to the mold layer, the outermost surface of the transfer layer, the outermost surface of the resin sheet), and then the embossing plate was pressed against the resin sheet using a press whose temperature had been adjusted to 170° C. After that, the embossing plate was peeled from the resin sheet. Thus, a resin sheet having an embossed surface was obtained (see FIG. 7).

Then, in each of Examples 24 to 36, the resin sheet was irradiated with an electron beam using an electron beam irradiation apparatus (CB250/30/20 mA manufactured by IWASAKI ELECTRIC CO., LTD.) at an accelerating voltage of 200 kV and an irradiation dose (kGy) shown in FIG. 17. At this time, in each of Examples 24 to 35, the resin sheet was irradiated with the electron beam from the side of its embossed surface (side of the transfer layer). In contrast, in Example 36, the resin sheet was irradiated with an electron beam from an opposite side of its embossed surface (side of the mold layer). On the other hand, in each of Example 37 and Comparative Examples 17 to 19, no electron beam irradiation was performed. In Example 37, the chemical crosslinking (silane crosslinking) reaction of the mold layer was performed by immersing the resin sheet having an embossed surface produced as described above in hot water at 80° C. for 6 hours.

Thus, a decorative sheet having an average thickness of 250 μm to 360 μm was obtained. Then, the ten-point average roughness ($R_{zJIS}$) and 100% modulus of the decorative sheet were measured in the same manner as in the foregoing examples.

Manufacture of Flat Plate-Like Molded Resin Article

A flat plate-like molded resin article was injection-molded by using each of the decorative sheets manufactured in Examples 24 to 37 and Comparative Examples 17 to 19 as described above. That is, first, the decorative sheet was placed in the fixed die of a flat plate-like injection molding die (120 mm×120 mm, thickness=3 mm, side gate) placed in an injection molding machine (PLASTAR Si-100IV manufactured by TOYO MACHINERY & METAL CO., LTD.) (clamping force=100 t) so that its embossed surface (transfer layer) faced a side from which a molten resin was injected, and then the movable die was closed. Next, the injection molding was performed with a PC/ABS mixed resin (Multilon TN-7500F) under conditions shown in FIG. 14. After a molded resin article had been cooled and solidified, the movable die was opened and then the molded resin article was taken out of the injection molding die. After that, only the mold layer of the decorative sheet was peeled (separated) from the molded resin article. Thus, a flat plate-like molded resin article, part of the surface of which was coated with the transfer layer having an embossed surface, was obtained.

Manufacture of Decorative Sheets According to Examples 38 to 41 and Comparative Example 20

In each of Examples 38 to 41 and Comparative Example 20, a resin composition was prepared according to the "formulation 9" as shown in FIG. 18, and then a resin sheet (mold layer) was obtained from the resin composition with a calender roll.

Next, the top of the mold layer was coated with a protective layer, a pattern layer, and an adhesion layer in the stated order with a gravure roll. Thus, a resin sheet, on which a transfer layer constituted by the three layers was formed, was obtained. FIG. 18 shows the thickness ("total A") of the transfer layer and the thickness of each layer constituting the transfer layer.

Further, the resin sheet was passed through an emboss roll whose temperature had been adjusted to 200° C. Thus, a resin sheet having an embossed surface on the side of the transfer layer was obtained.

Then, in each of Examples 38 to 41, the resin sheet was irradiated with an electron beam from a side of its embossed surface (side of the transfer layer) using an electron beam irradiation apparatus (CB250/30/20 mA manufactured by IWASAKI ELECTRIC CO., LTD.) at an accelerating voltage of 200 kV and an irradiation dose (kGy) shown in FIG. 18. On the other hand, in Comparative Example 20, no electron beam irradiation was performed.

Thus, a decorative sheet having an average thickness of 330 µm to 350 µm was obtained. Then, the ten-point average roughness ($R_{zJIS}$) and 100% modulus of the decorative sheet were measured in the same manner as in the foregoing examples.

Manufacture of Molded Resin Article of Notebook Computer Casing Shape

The injection molding of a PC/ABS mixed resin (Multilon TN-7500F manufactured by Teijin Chemicals Ltd.) was performed under the same injection molding conditions as in Examples 20 to 23 and Comparative Example 16 as described above with the decorative sheets manufactured in Examples 38 to 41 and Comparative Example 20 as described above, respectively.

After a molded resin article had been cooled and solidified, the movable die was opened and then the molded resin article was taken out of the injection molding die. After that, only the mold layer of the decorative sheet was peeled (separated) from the molded resin article. Thus, a molded resin article of a notebook computer casing shape, part of the surface of which was coated with the transfer layer having an embossed surface, was obtained.

Evaluations of Examples 24 to 41 and Comparative Examples 17 to 20

The state of the surface of each of the molded resin articles manufactured in Examples 24 to 41 and Comparative Examples 17 to 20 was visually observed, and then the releasability and embossment transferability, and transfer layer transferability of the decorative sheet were evaluated. Here, the "transfer layer transferability" was evaluated as an indicator representing the accuracy with which a transfer layer was transferred from the decorative sheet onto the surface of the molded resin article.

Results of Evaluations of Examples 24 to 41 and Comparative Examples 17 to 20

FIGS. 17 and 18 each show the formulation (part(s) by weight) of resins and electron beam irradiation conditions (an accelerating voltage (kV) and an irradiation dose (kGy)) in the manufacture of a decorative sheet, the average thickness (µm), transfer layer thickness (µm), average thickness (µm) of a mold layer, ten-point average roughness ($R_{zJIS}$) (µm), and 100% modulus (MPa) of the resultant decorative sheet, and the results of the evaluations of the "releasability", "embossment transferability", "transfer layer transferability" in the injection molding.

Here, the average thickness of the mold layer was calculated by subtracting the thickness of the additional layer from the average thickness of the decorative sheet. That is, the average thickness (µm) of the mold layer shown in each of FIG. 17 and FIG. 18 was calculated by subtracting the thickness of the transfer layer as the additional layer (the "total A" of the "transfer layer thickness (µm)" shown in each of FIG. 17 and FIG. 18) from the average thickness of the decorative sheet (the "average thickness B (µm) of decorative resin sheet" shown in each of FIG. 17 and FIG. 18) (i.e., as "B-A"). Then, as shown in FIG. 17 and FIG. 18, in each of Examples 24 to 41 and Comparative Examples 17 to 20, the thickness of the additional layer (here, the thickness of the transfer layer) was smaller than the ten-point average roughness ($R_{zJIS}$) of the embossment and was smaller than the average thickness of the mold layer.

It should be noted that the term "NA" shown in the column "100% modulus" according to each of Comparative Examples 17 to 20 of FIGS. 17 and 18 means that the decorative sheet broke before 100% elongation in its tension test and hence its 100% modulus could not be measured. In addition, the mark "0" in the column "releasability" of each of FIGS. 17 and 18 means that the releasability of the decorative sheet from the molded resin article after the injection molding was good (the mold layer of the decorative sheet was neatly peeled (separated) from the molded resin article) and the mark "x" therein means that the releasability was bad (the decorative sheet was hard to peel (separate) because part of the mold layer thereof strongly adhered to the molded resin article). In addition, the mark "○" in the column "embossment transferability" of each of FIGS. 17 and 18 means that the embossment transferability was good (the embossment of the decorative sheet was accurately transferred onto the molded resin article) and the mark "x" therein means that the transferability was bad (the embossment of the decorative sheet was not accurately transferred onto the molded resin article, and for example, the disappearance of the embossment, or the roughening or flashing of the surface on which the embossment was formed occurred). Further, the mark "○" in the column "transfer layer transferability" of each of FIG. 17 and FIG. 18 means that transfer layer transferability was good (the transfer layer of the decorative sheet was accurately transferred onto the molded resin article) and the mark "x" therein means that the transferability was bad (the transfer layer of the decorative sheet was not accurately transferred onto the molded resin article).

Figure 19A:
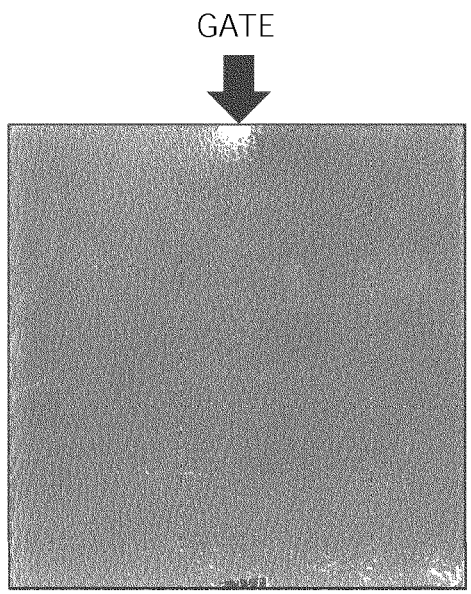
FIG. 19A An explanatory diagram showing an example of the results of observation of the surface of a molded resin article manufactured in Example 29 according to the embodiment of the present invention.
Figure 19B:
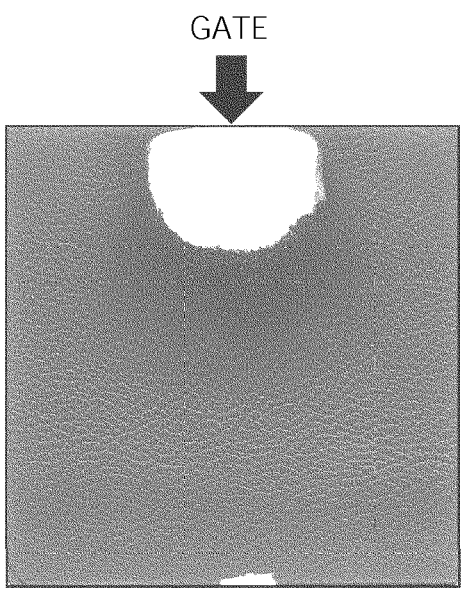
FIG. 19B An explanatory diagram showing an example of the results of observation of the surface of a molded resin article manufactured in Comparative Example 17 according to the embodiment of the present invention.

FIGS. 19A and 19B each show the result of the observation of transfer layer transferability on the surface of a flat plate-like molded resin article. FIG. 19A shows a photograph obtained by photographing the surface of the molded resin article manufactured in Example 29 and FIG. 19B shows a photograph obtained by photographing the surface of the molded resin article manufactured in Comparative Example 17. It should be noted that a "gate" indicated by an arrow in each of FIGS. 19A and 19B represents a position corresponding to the gate of the injection molding die into which the molten resin was injected in the injection molding as in FIGS. 16A to 16C. In addition, the transfer layer (pattern layer) was stained with black ink and a white molding resin was used in the molded resin article. Accordingly, in FIG. 19A and FIG. 19B, a black portion represents a portion onto which the transfer layer is transferred and a white portion represents a portion onto which the transfer layer is not transferred.

As shown in FIGS. 17 and 18, in the injection molding in each of Examples 24 to 41, the releasability, the embossment transferability, and the transfer layer transferability were good, and hence a molded resin article onto which an embossment with excellent design was accurately transferred was obtained. Here, in each of Examples 24 to 41, the thickness of the transfer layer as the additional layer was smaller than the ten-point average roughness ($R_{zJIS}$) of the embossment (in other words, the ten-point average roughness ($R_{zJIS}$) of the embossment of the decorative sheet was larger than the thickness of the transfer layer as the additional layer), and hence the design of the embossment formed on the molded resin article was excellent. Such an effect was obtained not only in the case where a decorative sheet obtained by irradiating the embossed surface of a resin sheet with an energy ray (here, an electron beam) from the side of the embossed surface was used (Examples 24 to 35 and 38 to 41) but also in the case where a decorative sheet obtained by irradiating the embossed surface with the energy ray from an opposite side of the embossed surface was used (Example 36) and in the case where a decorative sheet obtained by chemical crosslinking without performing energy ray irradiation was used (Example 37). In contrast, in the injection molding in each of Comparative Examples 17 to 20, the embossment transferability and the transfer layer transferability were bad, and hence only a molded resin article onto which an embossment and a transfer layer were not accurately transferred was obtained.

In addition, as shown in FIG. 19A, on the surface of the molded resin article manufactured in Example 29, the color of the surface was black except for the extreme vicinity of the gate and hence the transfer layer transferability was good. In contrast, as shown in FIG. 19B, on the surface of the molded resin article manufactured in Comparative Example 17, a portion onto which the transfer layer was not transferred (white portion) existed even in a portion distant from the gate and hence the transfer layer transferability was bad. It should be noted that the embossment transferability was evaluated in the molded resin article of a notebook computer casing shape as well by the same criteria.

REFERENCE SIGNS LIST

10 decorative sheet, 11 embossed surface, 12 rear surface, 20 injection molding die, 21 movable die, 21a inner surface, 22 fixed die, 22a inner surface, 23 cavity, 30 molding resin, 40 molded resin article, 40a resin main body, 41 surface of molded resin article on which embossment is formed, 41a surface of resin main body, 50 mold layer, 51 surface of mold layer, 60 transfer layer, 60a protective layer, 60b pattern layer, 60c adhesion layer, 61 surface of transfer layer, 62 surface of transfer layer on mold layer side, 70 resin sheet.

The invention claimed is:

1. A method of manufacturing a molded resin article, the method comprising:
   a providing step of providing a decorative resin sheet, which comprises a crosslinked mold layer having a first surface and a second surface and contains 50 wt % or more, with respect to the entirety of resin components in the mold layer, of a polyolefin-based elastomer, by irradiating the mold layer in an uncrosslinked state with an energy ray at a defined acceleration voltage and irradiation dosage so as to crosslink the mold layer and provide the decorative resin sheet with a 100% modulus at 200° C. of 0.02 MPa or more, which modulus is measured at a tension speed of 200 mm/min by a method including setting a distance between a pair of chucks for holding both ends of a test piece of a dumbbell shape No. 3 at a time of initiation of a test to 60 mm and defining a time point at which the distance between the pair of chucks reaches 120 mm as a time point at which a tensile elongation of the test piece becomes 100% in JIS K6251 (2004 version), wherein an embossment is formed on the second surface of the mold layer;
   a placing step of placing the decorative resin sheet after the crosslinking in an injection molding die so that the second surface of the mold layer faces a side of the injection molding die from which a molten resin is injected:
   a molding step of injecting the molten resin in a direction toward the second surface of the mold layer placed in the injection molding die to mold an injection molded resin article into conformity with the embossment, wherein the first surface of the mold layer directly contacts an inner surface of the injection molding die during the molding step; and
   a separating step of separating the molded resin article from the decorative resin sheet, thereby transferring the embossment onto a surface of the molded resin article.

2. The method of manufacturing a molded resin article according to claim 1, wherein the mold layer is also crosslinked by chemical crosslinking.

3. The method of manufacturing a molded resin article according to claim 1, wherein the decorative resin sheet has a transfer layer laminated over the second surface of the mold layer during the injection molding step, wherein an embossment corresponding to the embossment of the second surface of the mold layer is formed on a surface of the transfer layer as well.

4. The method of manufacturing a molded resin article according to claim 3, wherein the embossment of the transfer layer has a ten-point average roughness ($R_{zJIS}$), which is measured in conformity with JIS B0601-2001, larger than a thickness of the transfer layer.

5. The method of manufacturing a molded resin article according to claim 3, wherein the transfer layer has a thickness of 0.5 μm to 150 μm.

6. The method of manufacturing a molded resin article according to claim 3, wherein the transfer layer includes a protective layer and/or a pattern layer.

7. The method of manufacturing a molded resin article according to claim 1, wherein the decorative resin sheet is constituted only by the mold layer.

8. The method of manufacturing a molded resin article according to claim 1, wherein the embossment has a ten-point average roughness ($R_{zJIS}$) of 10 μm to 400 μm, which is measured in conformity with JIS B0601-2001.

9. The method of manufacturing a molded resin article according to claim 1, wherein the acceleration voltage is from 100 to 300 kV.

10. The method of manufacturing a molded resin article according to claim 1, wherein the irradiation dose is from 30 to 2,000 kGy.

11. The method of manufacturing a molded resin article according to claim 1, wherein the energy ray is selected from electron beam, γ-ray, UV light, and visible light.

12. The method of manufacturing a molded resin article according to claim 1, wherein the energy ray is an electron beam.

* * * * *